US012811746B2

(12) United States Patent
Ko et al.

(10) Patent No.: US 12,811,746 B2
(45) Date of Patent: Nov. 24, 2026

(54) METHOD AND DEVICE FOR SELECTING A TRANSMISSION RESOURCE OF A DEDICATED RESOURCE POOL REFERENCE SIGNAL BASED ON IUC

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 18/718,279

(22) PCT Filed: Jan. 29, 2024

(86) PCT No.: PCT/KR2024/001352
§ 371 (c)(1),
(2) Date: Jun. 10, 2024

(87) PCT Pub. No.: WO2024/162720
PCT Pub. Date: Aug. 8, 2024

(65) Prior Publication Data

US 2026/0163696 A1 Jun. 11, 2026

Related U.S. Application Data

(60) Provisional application No. 63/442,401, filed on Jan. 31, 2023.

(51) Int. Cl.
*H04L 5/00* (2006.01)
*H04W 72/02* (2009.01)

(52) U.S. Cl.
CPC ........... *H04L 5/0051* (2013.01); *H04W 72/02* (2013.01)

(58) Field of Classification Search
CPC ............................. H04L 5/0051; H04W 72/02
See application file for complete search history.

(56) References Cited

U.S. PATENT DOCUMENTS 12,452,839 B2 * 10/2025 Lin ....................... H04W 72/02
2021/0337509 A1 * 10/2021 Selvanesan ............... H04L 1/08
(Continued)

FOREIGN PATENT DOCUMENTS

CN 107666364 A * 2/2018 ........... H04L 5/0046
CN 110391881 B * 4/2022 ............ H04W 72/53
(Continued)

OTHER PUBLICATIONS

VIVO, "Discussion on potential solutions for sidelink positioning", R1-2211012, 3GPP TSG RAN WG1 #111, Toulouse, France, Nov. 14-18, 2022.
(Continued)

*Primary Examiner* — Michael A Keller
(74) *Attorney, Agent, or Firm* — BRYAN CAVE LEIGHTON PAISNER LLP

(57) ABSTRACT

An operation method of a first device 100 in wireless communication system is proposed. The method may comprise: including at least one second resource in a second resource pool, corresponding to at least one first resource in which a conflict in a first resource pool is expected, into a first non-preferred resource set for a first reference signal; including at least one fourth resource in the first resource pool, corresponding to at least one third resource in which a conflict in the second resource pool is expected, into a second non-preferred resource set for first control information; and transmitting on the first resource pool, to a second device 200, an inter UE coordination message, including information for the first non-preferred resource set and information for the second non-preferred resource set.

15 Claims, 22 Drawing Sheets

(56) References Cited

U.S. PATENT DOCUMENTS

| | | | | |
|---|---|---|---|---|
| 2022/0272717 | A1 | 8/2022 | Chen et al. | |
| 2023/0309123 | A1* | 9/2023 | Farag | H04L 5/0051 |
| 2024/0049163 | A1* | 2/2024 | Zhou | H04W 76/14 |
| 2024/0098703 | A1* | 3/2024 | Li | H04W 72/25 |
| 2024/0250786 | A1* | 7/2024 | Huang | H04W 72/25 |
| 2025/0380307 | A1* | 12/2025 | Hwang | H04W 72/25 |

FOREIGN PATENT DOCUMENTS

| | | | | | |
|---|---|---|---|---|---|
| CN | 118140564 | A | * | 6/2024 | |
| EP | 3496442 | A1 | * | 6/2019 | H04W 72/23 |
| ID | P202300526 | A | * | 1/2023 | |
| JP | 2025515455 | A | * | 5/2025 | H04W 72/0453 |
| WO | WO-2023093971 | A1 | * | 6/2023 | H04W 72/25 |

OTHER PUBLICATIONS

Catt et al., "Further discussion on potential solutions for SL positioning", R1-2211203, 3GPP TSG RAN WG1 #111, Toulouse, France, Nov. 14-18, 2022.

Spreadtrum Communications, "Discussion on potential solutions for SL positioning", R1-2211238, 3GPP TSG RAN WG1 #111, Toulouse, France, Nov. 14-18, 2022.

OPPO, "Discussion on potential solutions for SL positioning", R1-2211447, 3GPP TSG RAN WG1 #111, Toulouse, France, Nov. 14-18, 2022.

* cited by examiner

METHOD AND DEVICE FOR SELECTING A TRANSMISSION RESOURCE OF A DEDICATED RESOURCE POOL REFERENCE SIGNAL BASED ON IUC

CROSS-REFERENCE TO RELATED APPLICATIONS

This application is the National Stage filing under 35 U.S.C. 371 of International Application No. PCT/KR2024/001352, filed on Jan. 29, 2024, which claims the benefit of U.S. Provisional Applications No. 63/442,401 filed on Jan. 31, 2023, which is hereby incorporated by reference herein in its entirety.

TECHNICAL FIELD

This disclosure relates to a wireless communication system.

BACKGROUND

5G NR is the next generation technology of long term evolution (LTE) and is a new clean-slate form mobile communication system with high performance, low latency, and high availability. 5G NR may utilize all available spectrum resources, from the low frequency bands below 1 GHz to the mid-frequency bands from 1 GHz to 10 GHz and the high frequency (millimeter wave) bands above 24 GHz.

The 6G (wireless communication) system is aimed at (i) very high data rates per device, (ii) a very large number of connected devices, (iii) global connectivity, (iv) very low latency, (v) lowering energy consumption for battery-free internet of things (IoT) devices, (vi) ultra-reliable connectivity, and (vii) connected intelligence with machine learning capabilities. The vision of the 6G system may be in four aspects: intelligent connectivity, deep connectivity, holographic connectivity, and ubiquitous connectivity, and the 6G system may satisfy the requirements as shown in Table 1 below. For example, Table 1 may represent an example of the requirements of a 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

SUMMARY

According to an embodiment of the present disclosure, a method for performing, by a first device, wireless communication may be proposed. For example, the method may comprise: obtaining information related to a first resource pool for receiving first control information related to a reception of a first reference signal and information related to a second resource pool for receiving the first reference signal, wherein the first resource pool and the second resource pool may have a one-to-one correspondence relationship; including at least one second resource in the second resource pool, corresponding to at least one first resource in which a conflict in the first resource pool is expected, into a first non-preferred resource set for the first reference signal; including at least one fourth resource in the first resource pool, corresponding to at least one third resource in which a conflict in the second resource pool is expected, into a second non-preferred resource set for the first control information; and transmitting on the first resource pool, to a second device, an inter user equipment (UE) coordination message, including information for the first non-preferred resource set and information for the second non-preferred resource set.

According to an embodiment of the present disclosure, a first device for performing wireless communication may be proposed. For example, the first device may comprise: at least one transceiver; at least one processor; and at least one memory operably connectable to the at least one processor and storing instructions. For example, the instructions, based on being executed by the at least one processor, may cause the first device to perform operations, wherein the operations may comprise: obtaining information related to a first resource pool for receiving first control information related to a reception of a first reference signal and information related to a second resource pool for receiving the first reference signal, wherein the first resource pool and the second resource pool may have a one-to-one correspondence relationship; including at least one second resource in the second resource pool, corresponding to at least one first resource in which a conflict in the first resource pool is expected, into a first non-preferred resource set for the first reference signal; including at least one fourth resource in the first resource pool, corresponding to at least one third resource in which a conflict in the second resource pool is expected, into a second non-preferred resource set for the first control information; and transmitting on the first resource pool, to a second device, an inter user equipment (UE) coordination message, including information for the first non-preferred resource set and information for the second non-preferred resource set.

According to an embodiment of the present disclosure, a device adapted to control a first user equipment (UE) may be proposed. For example, the device may comprise: at least one processor; and at least one memory operably connectable to the at least one processor and storing instructions. For example, the instructions, based on being executed by the at least one processor, may cause the first UE to perform operations, wherein the operations may comprise: obtaining information related to a first resource pool for receiving first control information related to a reception of a first reference signal and information related to a second resource pool for receiving the first reference signal, wherein the first resource pool and the second resource pool may have a one-to-one correspondence relationship; including at least one second resource in the second resource pool, corresponding to at least one first resource in which a conflict in the first resource pool is expected, into a first non-preferred resource set for the first reference signal; including at least one fourth resource in the first resource pool, corresponding to at least one third resource in which a conflict in the second resource pool is expected, into a second non-preferred resource set for the first control information; and transmitting on the first resource pool, to a second UE, an inter UE coordination message, including information for the first non-preferred resource set and information for the second non-preferred resource set.

According to an embodiment of the present disclosure, a non-transitory computer-readable storage medium storing instructions may be proposed. For example, the instructions based on being executed, may cause a first device to: obtain information related to a first resource pool for receiving first control information related to a reception of a first reference signal and information related to a second resource pool for receiving the first reference signal, wherein the first resource pool and the second resource pool may have a one-to-one correspondence relationship; include at least one second resource in the second resource pool, corresponding to at least one first resource in which a conflict in the first resource pool is expected, into a first non-preferred resource set for the first reference signal; include at least one fourth resource in the first resource pool, corresponding to at least one third resource in which a conflict in the second resource pool is expected, into a second non-preferred resource set for the first control information; and transmit on the first resource pool, to a second device, an inter user equipment (UE) coordination message, including information for the first non-preferred resource set and information for the second non-preferred resource set.

According to an embodiment of the present disclosure, a method for performing, by a second device, wireless communication may be proposed. For example, the method may comprise: obtaining information related to a first resource pool for transmitting first control information related to a transmission of a first reference signal and information related to a second resource pool for transmitting the first reference signal, wherein the first resource pool and the second resource pool may have a one-to-one correspondence relationship; and receiving on the first resource pool, from a first device, an inter user equipment (UE) coordination message including information for a first non-preferred resource set for the first reference signal and information for a second non-preferred resource set for the first control information, wherein the first non-preferred resource set may include at least one second resource in the second resource set, corresponding to at least one first resource in which a conflict in the first resource pool is expected by the first device, and wherein the second non-preferred resource set may include at least one fourth resource in the first resource set, corresponding to at least one third resource in which a conflict in the second resource pool is expected by the first device.

According to an embodiment of the present disclosure, a second device for performing wireless communication may be proposed. For example, the second device may comprise: at least one transceiver; at least one processor; and at least one memory operably connectable to the at least one processor and storing instructions. For example, the instructions, based on being executed by the at least one processor, may cause the second device to perform operations, wherein the operations may comprise: obtaining information related to a first resource pool for transmitting first control information related to a transmission of a first reference signal and information related to a second resource pool for transmitting the first reference signal, wherein the first resource pool and the second resource pool may have a one-to-one correspondence relationship; and receiving on the first resource pool, from a first device, an inter user equipment (UE) coordination message including information for a first non-preferred resource set for the first reference signal and information for a second non-preferred resource set for the first control information, wherein the first non-preferred resource set may include at least one second resource in the second resource set, corresponding to at least one first resource in which a conflict in the first resource pool is expected by the first device, and wherein the second non-preferred resource set may include at least one fourth resource in the first resource set, corresponding to at least one third resource in which a conflict in the second resource pool is expected by the first device.

DETAILED DESCRIPTION

Figure 1:
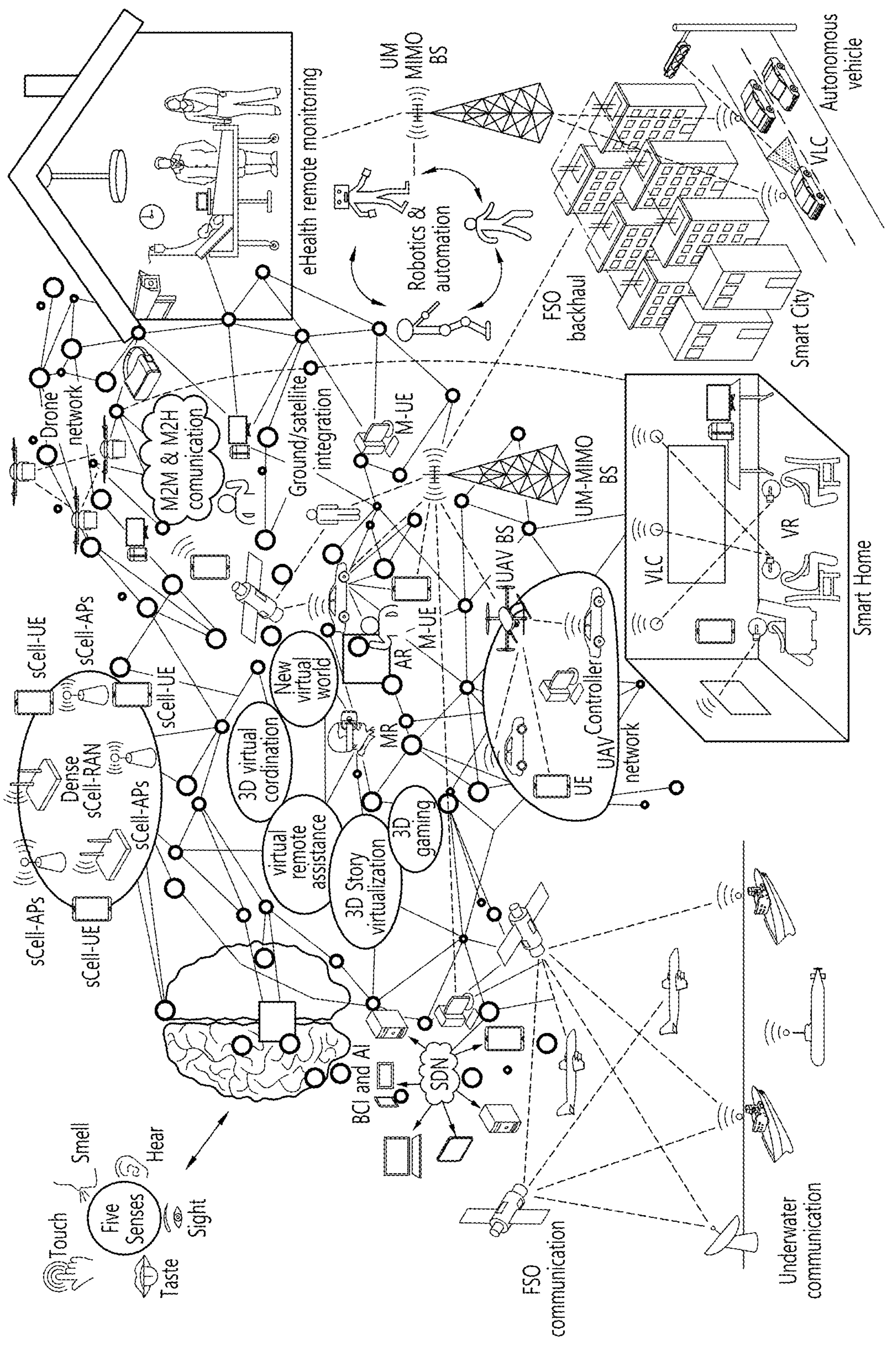
FIG. 1 shows a communication structure that can be provided in a 6G system, according to one embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

In this specification, being "configured or defined" may be interpreted as being configured or pre-configured to a device via predefined signaling (e.g., SIB, MAC, RRC) from a base station or network. In this specification, being "configured or defined" may be interpreted as being pre-configured to a device.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

The technologies proposed in this specification may be implemented in 6G wireless technologies and may be applied to various 6G systems. For example, 6G systems may include key factors such as enhanced mobile broadband (eMBB), ultra-reliable low latency communications (URLLC), massive machine-type communication (mMTC), artificial intelligence (AI) integrated communication, tactile internet, and high throughput, high network capacity, high energy efficiency, low backhaul and access network congestion, and enhanced data security.

FIG. 1 shows a communication structure that can be provided in a 6G system, according to one embodiment of the present disclosure. The embodiment of FIG. 1 may be combined with various embodiments of the present disclosure.

In 6G, new network features may include the follows.

Satellites integrated network

Connected intelligence: Unlike previous generations of wireless communication systems, 6G is revolutionary and the wireless evolution will be updated from "connected things" to "connected intelligence". AI can be applied at each step of the communication procedure (or each step of signal processing, as will be described later).

Seamless integration wireless information and energy transfer

Ubiquitous super 3D connectivity: Super 3D connection will be generated from 6G ubiquity to access networks and core network functions on drones and very low Earth orbit satellites.

Given the above new network characteristics of 6G, some common requirements may be as follows Small cell networks Ultra-dense heterogeneous network High-capacity backhaul Radar technology integrated with mobile technology: High-precision localization (or location-based services) through communication is one of the features of 6G wireless communication systems. Therefore, radar systems will be integrated with 6G networks.

Softwarization and virtualization

The following describes the core implementation technologies for 6G systems.

Artificial intelligence: Introducing AI into telecommunications may simplify and improve real-time data transmission. AI may use numerous analytics to determine the way complex target tasks are performed, which means AI may increase efficiency and reduce processing delays. Time-consuming tasks such as handover, network selection, and resource scheduling may be performed instantly by using AI. AI may also play an important role in machine-to-machine, machine-to-human, and human-to-machine communication. AI may also be a rapid communication in brain computer interface (BCI). AI-based communication systems may be supported by metamaterials, intelligent structures, intelligent networks, intelligent devices, intelligent cognitive radios, self-sustaining wireless networks, and machine learning.

Figure 2:
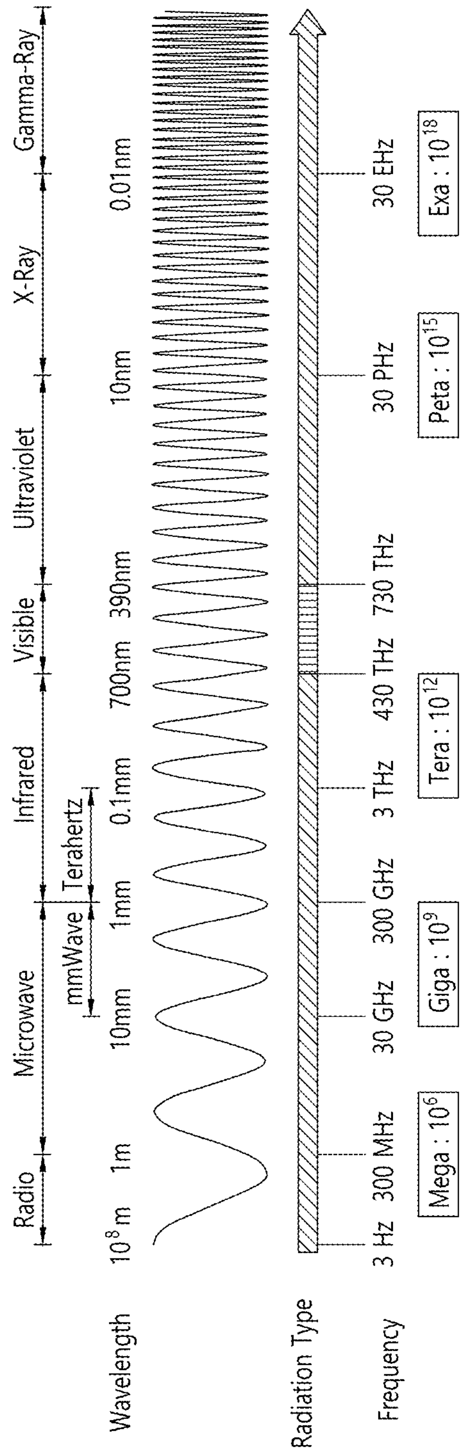
FIG. 2 shows an electromagnetic spectrum, according to one embodiment of the present disclosure.

THz Communication (Terahertz Communication): Data rates can be increased by increasing bandwidth. This can be accomplished by using sub-THz communication with a wide bandwidth and applying advanced massive MIMO technology. THz waves, also known as sub-millimeter radiation, refer to frequency bands between 0.1 and 10 THz with corresponding wavelengths typically ranging from 0.03 mm-3 mm. The 100 GHz-300 GHz band range (Sub THz band) is considered the main part of the THz band for cellular communications. Adding the Sub-THz band to the mmWave band increases the capacity of 6G cellular communications. 300 GHz-3 THz in the defined THz band is in the far infrared (IR) frequency band. The 300 GHz-3 THz band is part of the optical band, but it is on the border of the optical band, just behind the RF band. Thus, the 300 GHz-3 THz band exhibits similarities to RF. FIG. 2 shows an electromagnetic spectrum, according to one embodiment of the present disclosure. The embodiment of FIG. 2 may be combined with various embodiments of the present disclosure. Key characteristics of THz communications include (i) widely available bandwidth to support very high data rates, and (ii) high path loss at high frequencies (for which highly directive antennas are indispensable). The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.

Large-scale MIMO

HBF, Hologram Beamforming

Optical wireless technology

FSO Backhaul Network

Quantum Communication

Cell-free Communication

Integration of Wireless Information and Power Transmission

Integration of Wireless Communication and Sensing

Integrated Access and Backhaul Network

Big data Analysis

Reconfigurable Intelligent Surface

Metaverse

Block-chain

UAV, Unmanned Aerial Vehicle: Unmanned aerial vehicles (UAVs), or drones, will be an important component of 6G wireless communications. In most cases, high-speed data wireless connection is provided using UAV technology. A BS entity is installed on a UAV to provide cellular connection. UAVs have specific features not found in fixed BS infrastructure, such as easy deployment, strong line-of-sight links, and freedom of controlled mobility. During emergencies, such as natural disasters, the deployment of terrestrial communication infrastructure is not economically feasible and sometimes cannot provide services in volatile environments. UAVs can easily handle these situations. UAVs will be a new paradigm in wireless communications. This technology facilitates three basic requirements of wireless networks: eMBB, URLLC, and mMTC. UAVs can also support many other purposes such as enhancing network connectivity, fire detection, disaster emergency services, security and surveillance, pollution monitoring, parking monitoring, accident monitoring, etc. Therefore, UAV technology is recognized as one of the most important technologies for 6G communications.

Advanced air mobility, AAM: AAM is the higher-level concept of urban air mobility (UAM), which refers to air transportation in urban centers, and may include travel between urban centers and regional hubs.

Autonomous driving, self-driving: Vehicle to everything (V2X), a key element in building an autonomous driving infrastructure, may be a technology that allows cars to communicate and share with various elements on the road to drive autonomously, such as vehicle to vehicle (V2V) and vehicle to infrastructure (V2I). To maximize the performance of autonomous driving and ensure high safety, fast transmission speeds and low latency technologies are essential. In addition, in the future, autonomous driving may need to go beyond delivering warnings and intervene actively in vehicle operations and take control of the vehicle in dangerous situations. To do so, the amount of information that needs to be transmitted and received may be enormous, and in 6G, faster transmission speeds and lower latency than 5G are expected to maximize autonomous driving.

Figure 3:
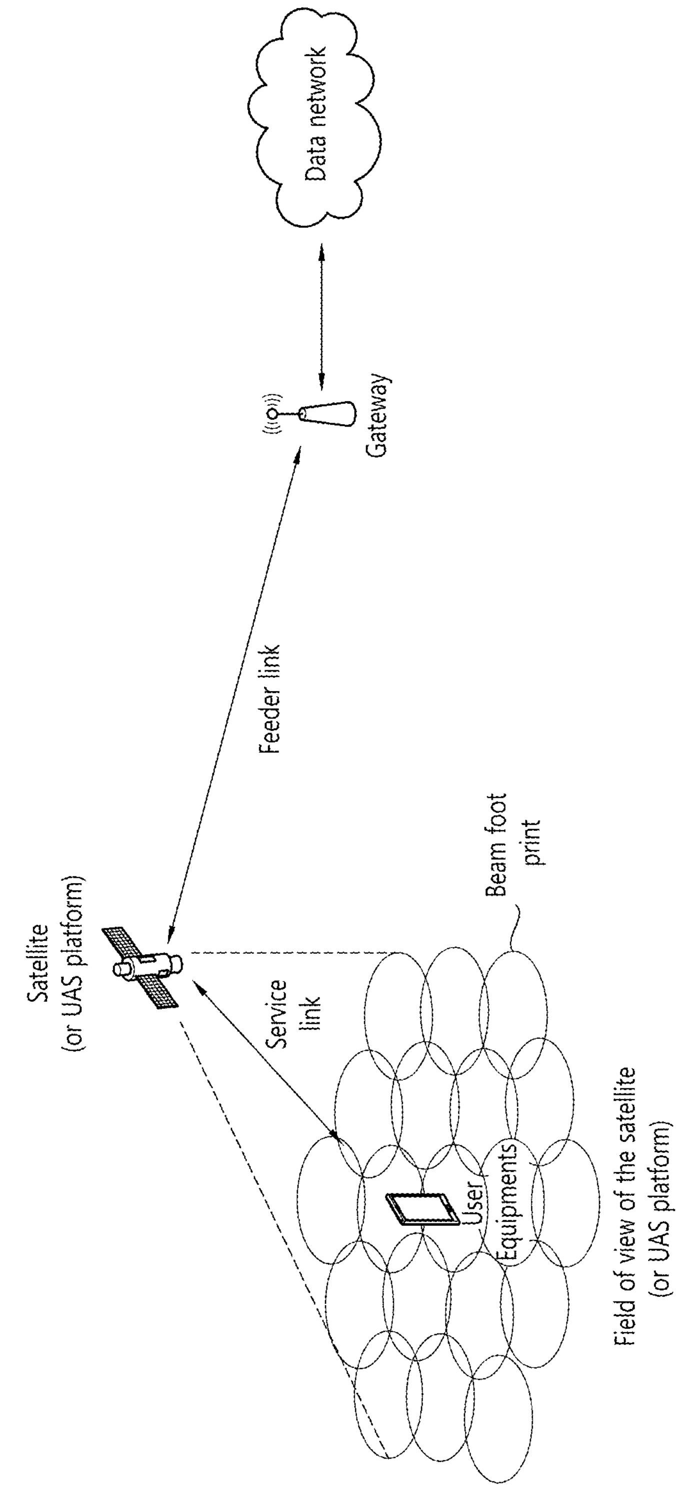
FIG. 3 shows an example of an NTN typical scenario based on a transparent payload, according to one embodiment of the present disclosure.
Figure 4:
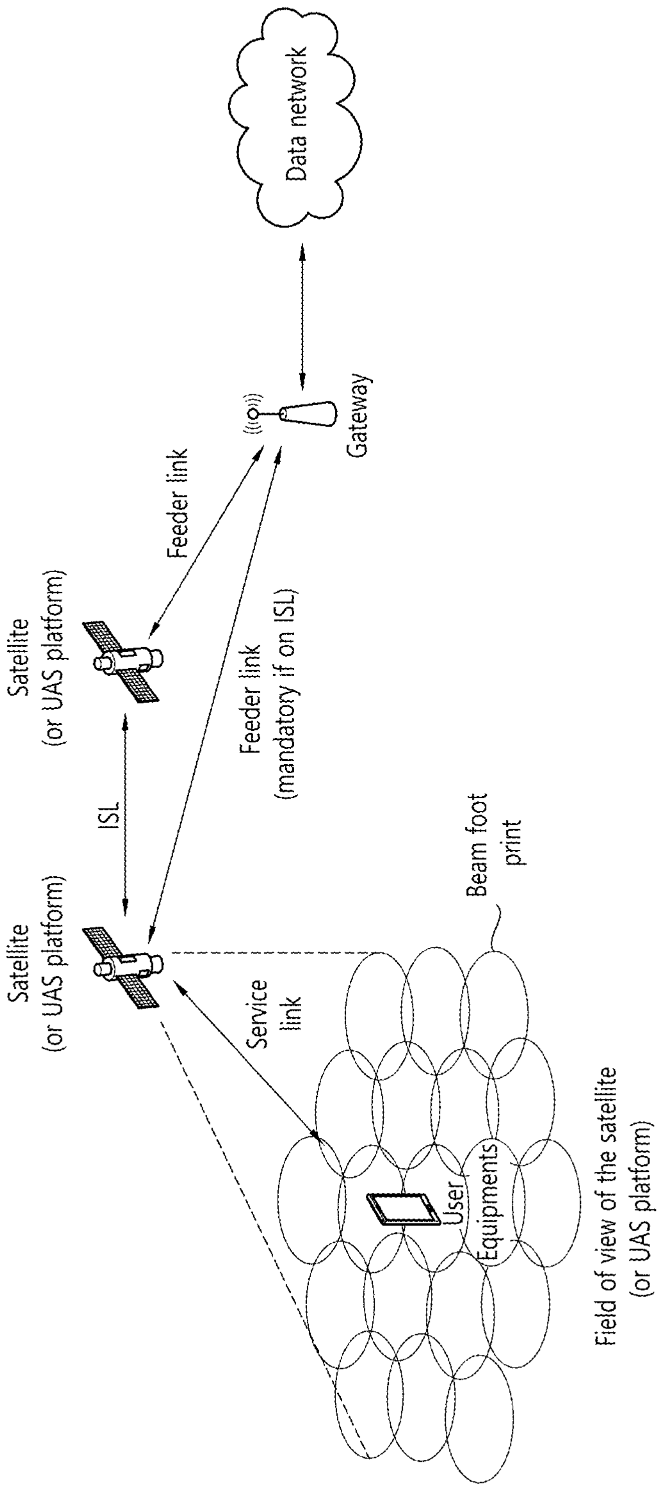
FIG. 4 shows an example of an NTN typical scenario based on a regenerative payload, according to one embodiment of the present disclosure.

Non-terrestrial networks, NTN: An NTN may represent a network or network segment that uses radio frequency (RF) resources aboard a satellite (or unmanned aerial system (UAS) platform). FIG. 3 shows an example of an NTN typical scenario based on a transparent payload, according to one embodiment of the present disclosure. FIG. 4 shows an example of an NTN typical scenario based on a regenerative payload, according to one embodiment of the present disclosure. The embodiments of FIG. 3 or FIG. 4 may be combined with various embodiments of the present disclosure. Referring to FIG. 3, a satellite (or UAS platform) may establish a service link with a UE. The satellite (or UAS platform) may be connected to a gateway via a feeder link. The satellite may be connected to the data network via a gateway. A beam footprint may refer to an area where signals transmitted by a satellite can be received. Referring to FIG. 4, a satellite (or UAS platform) may establish a service link with a UE. A satellite (or UAS platform) connected to a UE may be connected to other satellites (or UAS platforms) via inter-satellite links (ISLs). The other satellites (or UAS platforms) may be connected to a gateway via feeder links. Based on the regenerative payload, the satellite may be connected to the data network via other satellites and a gateway. If an ISL does not exist between the satellite and another satellite, a feeder link between the satellite and a gateway may be required. FIG. 3 and FIG. 4 are just examples of NTN scenarios, and NTN may be implemented based on scenarios in many different ways. For example, a satellite (or UAS platform) may implement a transparent or regenerative (with on board processing) payload. For example, the satellite (or UAS platform) may generate multiple beams over a service area designated based on the field of view of the satellite (or UAS platform). For example, the field of view of the satellite (or UAS platform) may vary depending on the on-board antenna diagram and the minimum elevation angle. For example, a transparent payload may include radio frequency filtering, frequency conversion, and amplification. Thus, the waveform signal repeated by the payload may not be changed. For example, a regenerative payload may include radio frequency filtering, frequency conversion and amplification, demodulation/decoding, switching and/or routing, and coding/modulation. For example, a regenerative payload may be substantially equivalent to carrying all or part of a base station's functionality on board a satellite (or UAS platform).

Figure 5:
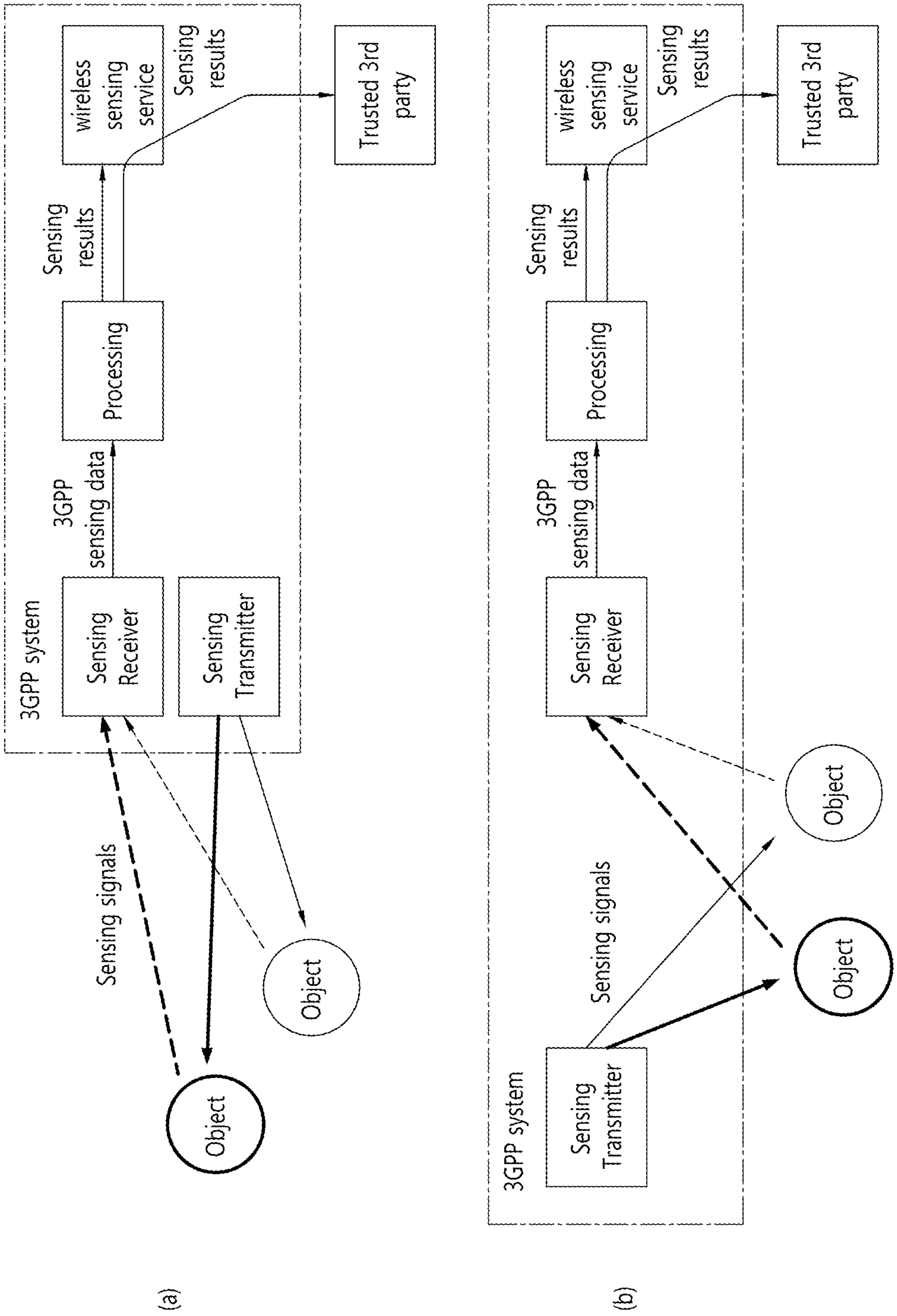
FIG. 5 shows an example of a sensing operation, according to one embodiment of the present disclosure.

Integrated sensing and communication, ISAC: Wireless sensing is a technology that uses radio frequencies to determine an object's instantaneous linear velocity, angle, distance (range), etc. to obtain information about an environment and/or the properties of an object in the environment. Since radio frequency sensing function does not require connecting to an object through a device in the network, it may provide a service for object positioning without a device. The ability to obtain range, velocity, and angle information from radio frequency signals can provide a wide range of new capabilities, such as detection of various objects, object recognition (e.g., vehicles, humans, animals, UAVs), and high-precision positioning, tracking, and activity recognition. Wireless sensing services may provide information to a variety of industries (e.g., unmanned aerial vehicles, smart homes, V2X, factories, railroads, public safety, etc.) enabling applications that provide, for example, intruder detection, assisted vehicle steering and navigation, trajectory tracking, conflict avoidance, traffic management, health and transportation management, and more. In some cases, wireless sensing may utilize non-3GPP type sensors (e.g., radar, cameras) to further support 3GPP-based sensing. For example, the operation of a wireless sensing service, i.e., the sensing operation, may rely on handling the transmission, reflection, and scattering of wireless sensing signals. Thus, wireless sensing may provide an opportunity to enhance existing communication systems from telecommunication networks to wireless communication and sensing networks. FIG. 5 shows an example of a sensing operation, according to one embodiment of the present disclosure. The embodiment of FIG. 5 may be combined with various embodiments of the present disclosure. Specifically, (a) of FIG. 5 shows an example of sensing using a sensing receiver and a sensing transmitter that are co-located (e.g., monostatic sensing), and (b) of FIG. 5 shows an example of sensing using separate sensing receivers and sensing transmitters (e.g., bistatic sensing).

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

A physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

In the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be spread into one or more slots, and the number of slots within a subframe may be determined based on subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following Table 2 shows the number of symbols per slot ($N^{slot}_{symb}$), the number of slots per frame ($N^{frame,u}_{slot}$), and the number of slots per subframe ($N^{subframe,u}_{slot}$), according to an SCS configuration (u), when Normal CP or Extended CP is used.

TABLE 2

| CP Type | SCS ($15*2^u$) | $N_{symb}^{slot}$ | $N_{slot}^{frame, u}$ | $N_{slot}^{subframe, u}$ |
|---|---|---|---|---|
| Normal CP | 15 kHz (u = 0) | 14 | 10 | 1 |
| | 30 kHz (u = 1) | 14 | 20 | 2 |
| | 60 kHz (u = 2) | 14 | 40 | 4 |
| | 120 kHz (u = 3) | 14 | 80 | 8 |
| | 240 kHz (u = 4) | 14 | 160 | 16 |
| Extended CP | 60 kHz (u = 2) | 12 | 40 | 4 |

Figure 6:
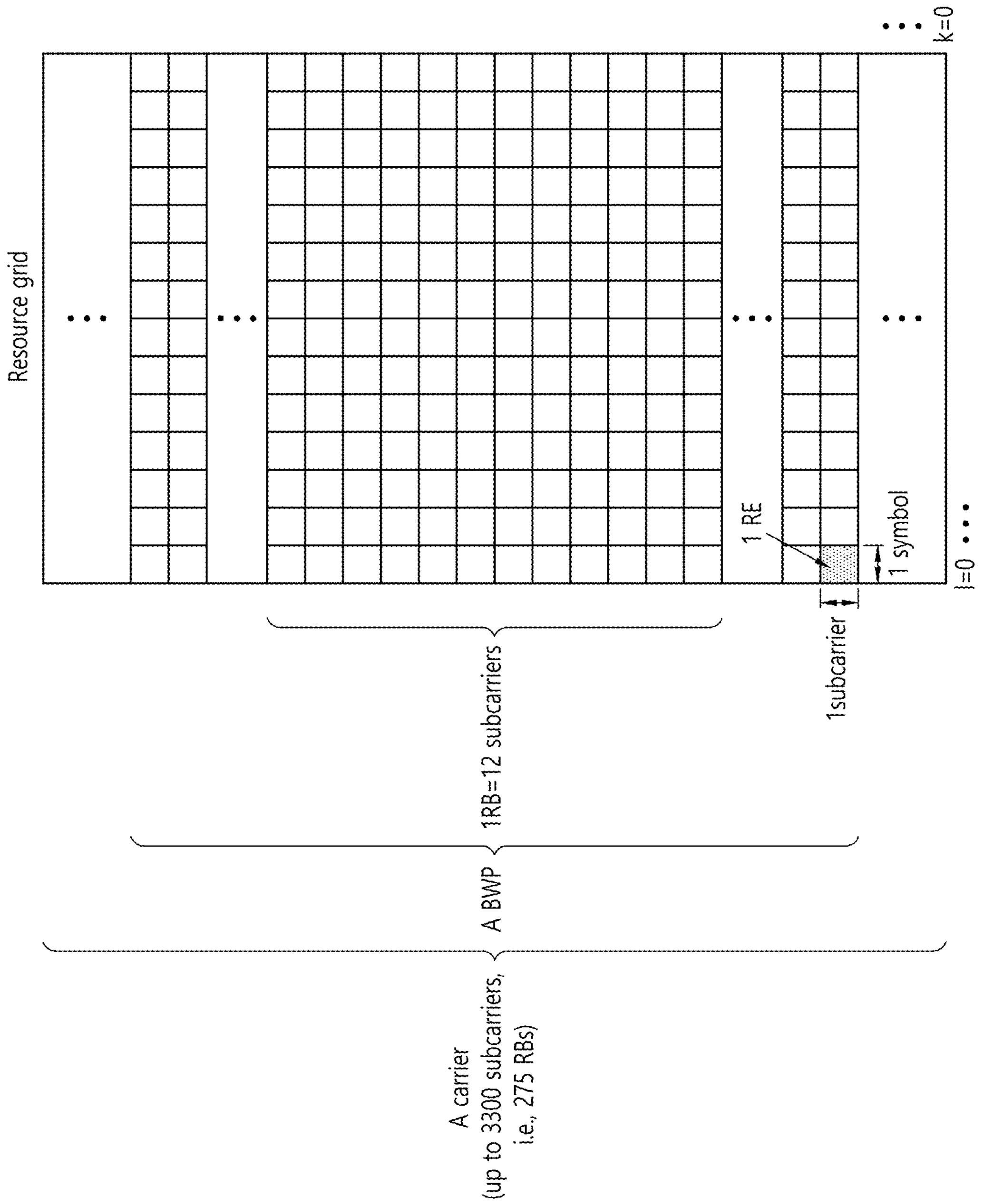
FIG. 6 shows a structure of a slot of a frame, based on an embodiment of the present disclosure.

FIG. 6 shows a structure of a slot of a frame, based on an embodiment of the present disclosure. The embodiment of FIG. 6 may be combined with various embodiments of the present disclosure.

Referring to FIG. 6, a slot includes a plurality of symbols in a time domain.

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Figure 7:
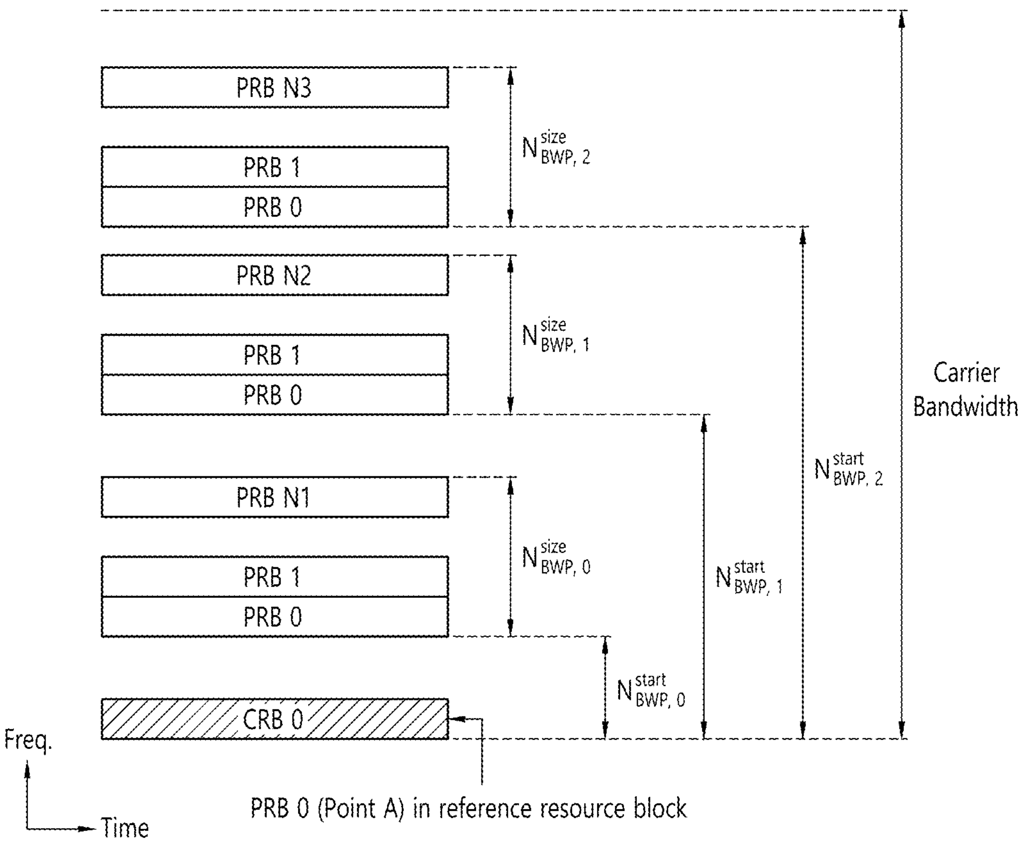
FIG. 7 shows an example of a BWP, based on an embodiment of the present disclosure.

The BWP may be a set of consecutive physical resource blocks (PRBs) in a given numerology. The PRB may be selected from consecutive sub-sets of common resource blocks (CRBs) for the given numerology on a given carrier FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{Size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

In this specification, a PSCCH may be replaced by a control channel, a physical control channel, a control channel related to a sidelink, a physical control channel related to a sidelink, etc. In this specification, a PSSCH may be replaced by a shared channel, a physical shared channel, a shared channel related to a sidelink, a physical shared channel related to a sidelink, etc.

Figure 8:
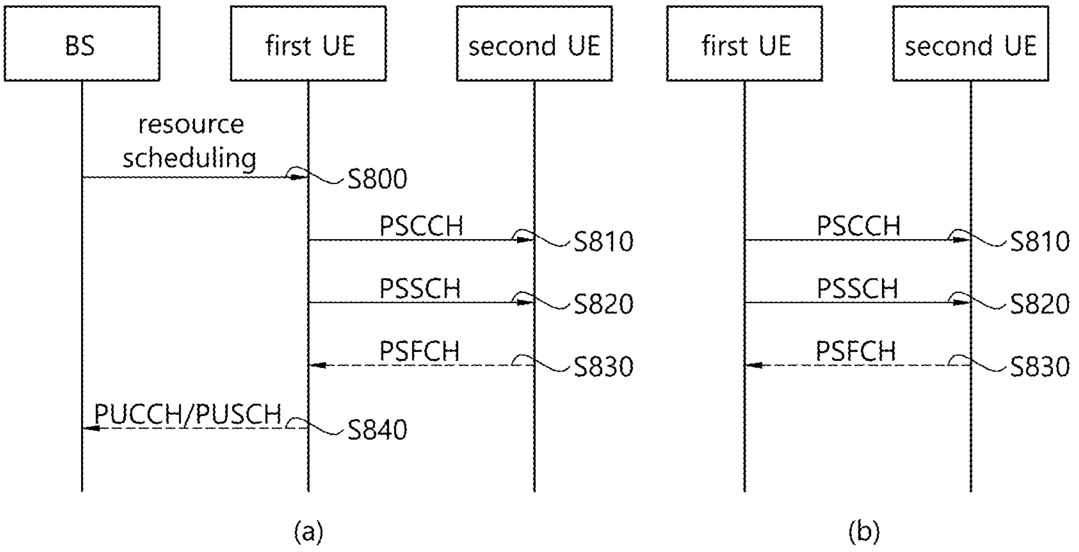
FIG. 8 shows a procedure of performing V2X or SL communication by a UE based on a resource allocation mode, based on an embodiment of the present disclosure.

FIG. 8 shows a procedure of performing V2X or SL communication by a UE based on a resource allocation mode, based on an embodiment of the present disclosure. The embodiment of FIG. 8 may be combined with various embodiments of the present disclosure.

Referring to (a) of FIG. 8, in resource allocation mode 1, a base station may schedule SL resource(s) to be used by a UE for SL transmission. For example, in step S800, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S810, the first UE may transmit a PSCCH (e.g., sidelink control information (SCI) or 1st-stage SCI) to a second UE based on the resource scheduling. In step S820, the first UE may transmit a PSSCH (e.g., 2nd-stage SCI, MAC PDU, data, etc.) related to the PSCCH to the second UE. In step S830, the first UE may receive a PSFCH related to the PSCCH/PSSCH from the second UE. For example, HARQ feedback information (e.g., NACK information or ACK information) may be received from the second UE through the PSFCH. In step S840, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be DCI for scheduling of SL.

Referring to (b) of FIG. 8, in resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re) selection procedure. For example, the sensing may be performed in a unit of subchannel(s). For example, in step S810, a first UE which has selected resource(s) from a resource pool by itself may transmit a PSCCH (e.g., sidelink control information (SCI) or 1st-stage SCI) to a second UE by using the resource(s). In step S820, the first UE may transmit a PSSCH (e.g., 2nd-stage SCI, MAC PDU, data, etc.) related to the PSCCH to the second UE. In step S830, the first UE may receive a PSFCH related to the PSCCH/PSSCH from the second UE.

Hereinafter, a UE procedure for determining a subset of resources to be reported to an higher layer in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

- the resource pool from which the resources are to be reported;
- L1 priority, $prio_{TX}$;
- the remaining packet delay budget;
- the number of sub-channels to be used for the PSSCH/PSCCH transmission in a slot, $L_{subCH}$;
- optionally, the resource reservation interval, $P_{rsvp\_TX}$, in units of msec.
- if the higher layer requests the UE to determine a subset of resources from which the higher layer will select resources for PSSCH/PSCCH transmission as part of re-evaluation or pre-emption procedure, the higher layer provides a set of resources ($r_0$, $r_1$, $r_2$, . . . ) which may be subject to re-evaluation and a set of resources $$(r'_0, r'_1, r'_2, \ldots)$$

which may be subject to pre-emption.

- it is up to UE implementation to determine the subset of resources as requested by higher layers before or after the slot $$r''_i - T_3,$$

where $$r''_i$$

is the slot with the smallest slot index among ($r_0$, $r_1$, $r_2$, . . . ) and $$(r'_0, r'_1, r'_2, \ldots),$$

and $T_3$ is equal to $$T^{SL}_{proc,1},$$

where $$T^{SL}_{proc,1}$$

is defined in slots, and where $\mu_{SL}$ is the SCS configuration of the SL BWP.

The following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j$=$prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-Sensing Window msec.

sl-TxPercentageList: internal parameter X for a given $prio_{TX}$ is defined as sl-TxPercentageList ($prio_{TX}$) converted from percentage to ratio.

sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P_{rsvp\_TX}'$.

Notation:

$$\left(t_0'^{SL}, t_1'^{SL}, t_2'^{SL}, \ldots\right)$$

may denoted the set of slots which belongs to the sidelink resource pool.

For example, a UE may select a set of candidate resources (Sa) based on Table 3. For example, when resource (re) selection is triggered, a UE may select a candidate resource set (Sa) based on Table 3. For example, when re-evaluation or pre-emption is triggered, a UE may select a candidate resource set (Sa) based on Table 3.

TABLE 3

The following steps are used:

1) A candidate single-slot resource for transmission $R_{x,y}$ is defined as a set of $L_{subCH}$ contiguous sub−channels with sub−channel x + j in slot $t_y'^{SL}$ where j = 0, … , $L_{subCH}$ − 1. The UE shall assume that any set of $L_{subCH}$ contiguous sub-channels included in the corresponding resource pool within the time interval [n + $T_1$, n + $T_2$] correspond to one candidate single-slot resource, where selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).

The total number of candidate single-slot resources is denoted by $M_{total}$.

2) The sensing window is defined by the range of slots $\left[n - T_0, n - T^{SL}_{proc,0}\right)$ where $T_0$ is defined above and $T^{SL}_{proc,0}$ is defined in slots in Table 8.1.4−1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter Th($p_i$, $p_j$) is set to the corresponding value of RSRP threshold indicated by the i-th field in sl-Thres-RSRP-List, where i = $p_i$ + ($p_j$ − 1) * 8.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m'^{SL}$ in Step 2.

for any periodicity value allowed by the higher layer parameter sl-ResourceReservePeriodList and a hypothetical SCI format 1−A received in slot $t_m'^{SL}$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:

a) the UE receives an SCI format 1−A in slot $t_m'^{SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

TABLE 3-continued

| |
|---|
| b) the RSRP measurement performed, according to clause 8.4.2.1 for the received SCI format 1-A, is higher than $Th(prio_{RX}, prio_{TX})$; |
| c) the SCI format received in slot $t'^{SL}_{m}$ or the same SCI format which, if and only if the 'Resource reservation period' field is present in the received SCI format 1-A, is assumed to be received in slot(s) $t'^{SL}_{m+q\times P'_{rsvp\_RX}}$ determines according to clause 8.1.5 the set of resource blocks and slots which overlaps with $R_{x,y+j\times P'_{rsvp\_TX}}$ for q = 1, 2, ..., Q and j = 0, 1, ..., $C_{resel}-1$. Here, $P'_{rsvp\_RX}$ is $P_{rsvp\_RX}$ converted to units of logical slots according to clause 8.17, $Q = \left\lceil \frac{T_{scal}}{P_{rsvp\_RX}} \right\rceil$ if $P_{rsvp\_RX} < T_{scal}$ and $n' - m \le P'_{rsvp\_RX}$, where $t'^{SL}_{n'} = n$ if slot n belongs to the set $(t'^{SL}_{0}, t'^{SL}_{1}, \ldots, t'^{SL}_{T'_{max}-1})$, otherwise slot $t'^{SL}_{n'}$ is the first slot after slot n belonging to the set $(t'^{SL}_{0}, t'^{SL}_{1}, \ldots, t'^{SL}_{T'_{max}-1})$; otherwise Q = 1. $T_{scal}$ is set to selection window size $T_2$ converted to units of msec. |
| 7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4. |
| The UE shall report set $S_A$ to higher layers. |
| If a resource $r_i$ from the set $(r_0, r_1, r_2, \ldots)$ is not a member of $S_A$, then the UE shall report re-evaluation of the resource $r_i$ to higher layers. |
| If a resource $r'_i$ from the set $(r'_0, r'_1, r'_2, \ldots)$ meets the conditions below then the UE shall report pre-emption of the resource $r'_i$ to higher layers |
| $r'_i$ is not a member of $S_A$, and |
| $r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions: |
| sl-PreemptionEnable is provided and is equal to 'enabled' and $prio_{TX} > prio_{RX}$ |
| sl-PreemptionEnable is provided and is not equal to 'enabled', and $prio_{RX} < prio_{pre}$ and $prio_{TX} > prio_{RX}$ |

Meanwhile, partial sensing may be supported for power saving of the UE. For example, in LTE SL or LTE V2X, the UE may perform partial sensing based on Tables 4 and 5.

TABLE 4

| |
|---|
| In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. |
| In sidelink transmission mode 3, when requested by higher layers in subframe n for a carrier, the UE shall determine the set of resources to be reported to higher layers in sensing measurement according to the steps described in this Subclause. Parameters $L_{subCH}$ $P_{rsvp\_TX}$ and $prio_{TX}$ are all provided by higher layers. $C_{resel}$ is determined by $C_{resel}$ = 10*SL_RESOURCE_RESELECTION_COUNTER, where SL_RESOURCE_RESELECTION_COUNTER is provided by higher layers. |
| . . . |
| If partial sensing is configured by higher layers then the following steps are used: |
| 1) A candidate single-subframe resource for PSSCH transmission $R_{x,y}$ is defined as a set of $L_{subCH}$ contiguous sub-channels with sub-channel x + j in subframe $t^{SL}_{y}$ where j = 0, ..., $L_{subCH}-1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$ · UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of |

TABLE 4-continued

| |
|---|
| subframes correspond to one candidate single-subframe resource. The total number of the candidate single-subframe resources is denoted by $M_{total}$. |
| 2) If a subframe $t_y^{SL}$ is included in the set of subframes in Step 1, the UE shall monitor any subframe $t_{y-k\times P_{step}}^{SL}$ if k−th bit of the high layer parameter gapCandidateSensing is set to 1. The UE shall perform the behaviour in the following steps based on PSCCH decoded and S-RSSI measured in these subframes. |
| 3) The parameter $Th_{a,b}$ is set to the value indicated by the i-th SL-ThresPSSCH-RSRP field in SL-ThresPSSCH-RSRP-List where i = (a − 1) * 8 + b. |
| 4) The set $S_A$ is initialized to the union of all the candidate single-subframe resources. The set $S_B$ is initialized to an empty set. |
| 5) The UE shall exclude any candidate single-subframe resource $R_{x,y}$ from the set $S_A$ if it meets all the following conditions: |
| the *UE* receives an *SCI* format 1 in subframe $t_m^{SL}$, and "Resource reservation" field and "Priority" field in the received SCI format 1 indicate the values $P_{rsvp\_RX}$ and $prio_{RX}$, respectively. |
| PSSCH-RSRP measurement according to the received SCI format 1 is higher than $TH_{prioTXprioRX,}$. |
| the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+j\times P'_{rsvp\_TX}}$ for q = 1, 2, ..., Q and j = 0, 1, ..., $C_{resel}$ − 1. Here, $Q = \frac{1}{P_{rsvp\_RX}}$ if $P_{rsvp\_RX} < 1$ and $y' - m \le P_{step} \times P_{rsvp\_RX} + P_{step}$, where $t_{y'}^{SL}$ is the last subframe of the Y subframes , and Q = 1 otherwise. |
| 6) If the number of candidate single-subframe resources remaining in the set $S_A$ is smaller than $0.2 \cdot M_{total}$, then Step 4 is repeated with $Th_{a,b}$ increased by 3 dB. |

TABLE 5

| |
|---|
| 7) For a candidate single-subframe resource $R_{x,y}$ remaining in the set $S_A$, the metric $E_{x,y}$ is defined as the linear average of S-RSSI measured in sub-channels x + k for K = 0, . . . , $L_{subCH}$ − 1 in the monitored subframes in Step 2 that can be expressed by $t_{y-P_{step}*j}^{SL}$ for a non−negative integer j. |
| 8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$. |
| 9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time. The UE shall report set $S_B$ to higher layers. |
| If transmission based on random selection is configured by upper layers and when the UE is configured by upper layers to transmit using resource pools on multiple carriers, the following steps are used: |
| 1) A candidate single-subframe resource for PSSCH transmission $R_{x,y}$ is defined as a set of $L_{subCH}$ contiguous sub−channels with sub−channel x + j in subframe $t_y^{SL}$ where j = 0, ..., $L_{subCH}$ − 1. The UE shall assume that any set of $L_{subCH}$ contiguous sub-channels included in the corresponding PSSCH resource pool within the time interval [n + $T_1$, n + $T_2$] corresponds to one candidate single-subframe resource, where selections of $T_1$ and $T_2$ are up to UE implementations under $T_1 \le 4$ and $T_{2min}$ ($prio_{TX}$) $\le T_2 \le 100$, if $T_{2min}$ ($prio_{TX}$) is provided by higher layers for $prio_{TX}$, otherwise $20 \le T_2 \le 100$. UE selection of $T_2$ shall fulfil the latency requirement. The total number of the candidate single-subframe resources is denoted by $M_{total}$. |
| 2) The set $S_A$ is initialized to the union of all the candidate single-subframe resources. The set $S_B$ is initialized to an empty set. |
| 3) The UE moves the candidate single-subframe resource $R_{x,y}$ from the set $S_A$ to $S_B$. |

TABLE 5-continued

| |
|---|
| 4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time]. |
| The UE shall report set $S_B$ to higher layers. |

Referring to (a) or (b) of FIG. 8, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority-3 bits

Frequency resource assignment-ceiling ($\log_2(N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment-5 bits when the value of the higher layer parameter sl-MaxNumPerReserve is configured to 2; otherwise 9 bits when the value of the higher layer parameter sl-MaxNumPerReserve is configured to 3

Resource reservation period-ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern-ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format-2 bits as defined in Table 6

Beta_offset indicator—2 bits as provided by higher layer parameter sl-BetaOffsets2ndSCI Number of DMRS port-1 bit as defined in Table 7

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 6

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 7

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 8
CSI request—1 bit

TABLE 8

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 8, in step S830, the first UE may receive the PSFCH. For example, the first UE and the second UE may determine a PSFCH resource, and the second UE may transmit HARQ feedback to the first UE using the PSFCH resource.

Referring to (a) of FIG. 8, in step S840, the first UE may transmit SL HARQ feedback to the base station through the PUCCH and/or the PUSCH.

Figure 9:
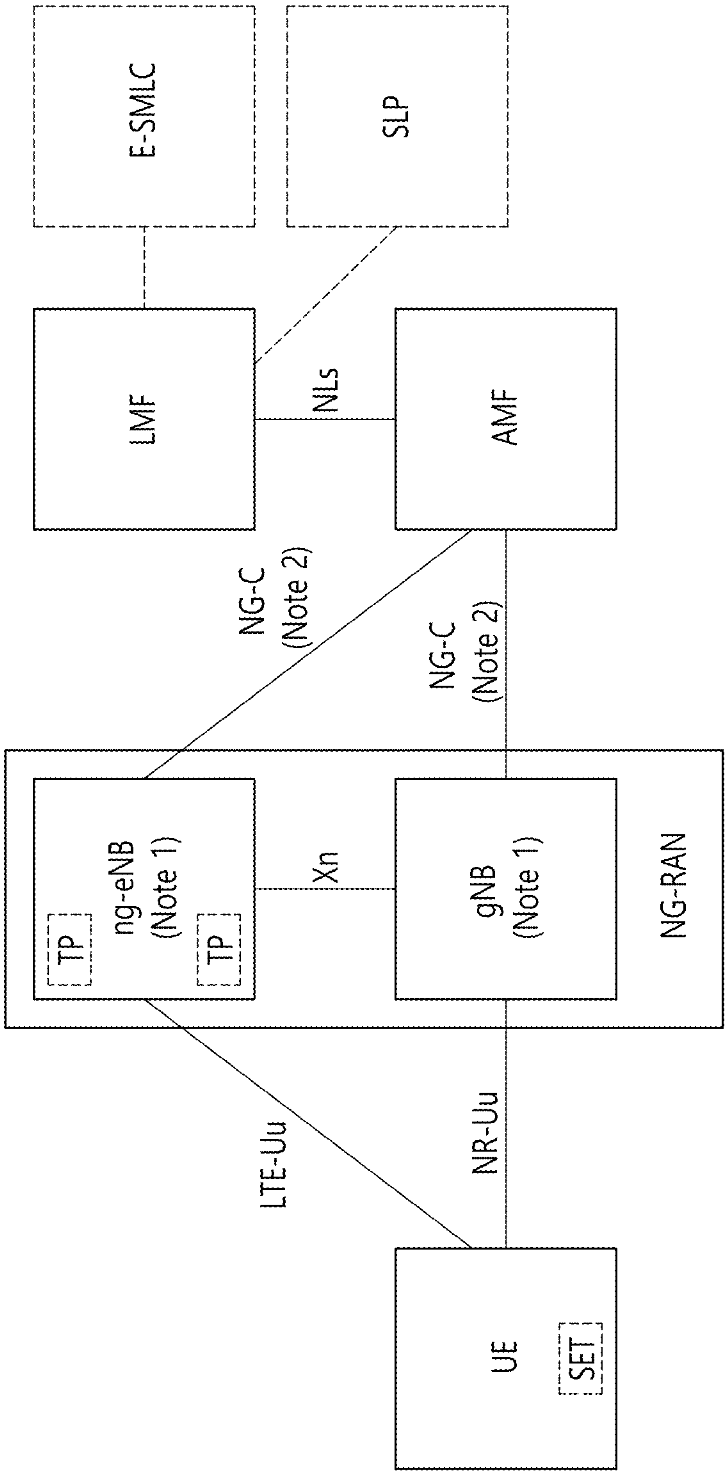
FIG. 9 shows an example of an architecture in a 5G system in which positioning for a UE connected to a Next Generation-Radio Access Network (NG-RAN) or E-UTRAN is possible, according to an embodiment of the present disclosure.

FIG. 9 shows an example of an architecture in a 5G system in which positioning for a UE connected to a Next Generation-Radio Access Network (NG-RAN) or E-UTRAN is possible, according to an embodiment of the present disclosure. The embodiment of FIG. 9 may be combined with various embodiments of the present disclosure.

Referring to FIG. 9, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated position or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for position estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centrer (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a position estimation value for the target UE and accuracy of position estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a position of the UE. For example, the UE may include an independent positioning function such as a global positioning system (GPS), and may report the position of the UE independent of NG-RAN transmission. Positioning information obtained independently as such may be utilized as assistance information of the positioning information obtained from the network.

Figure 10:
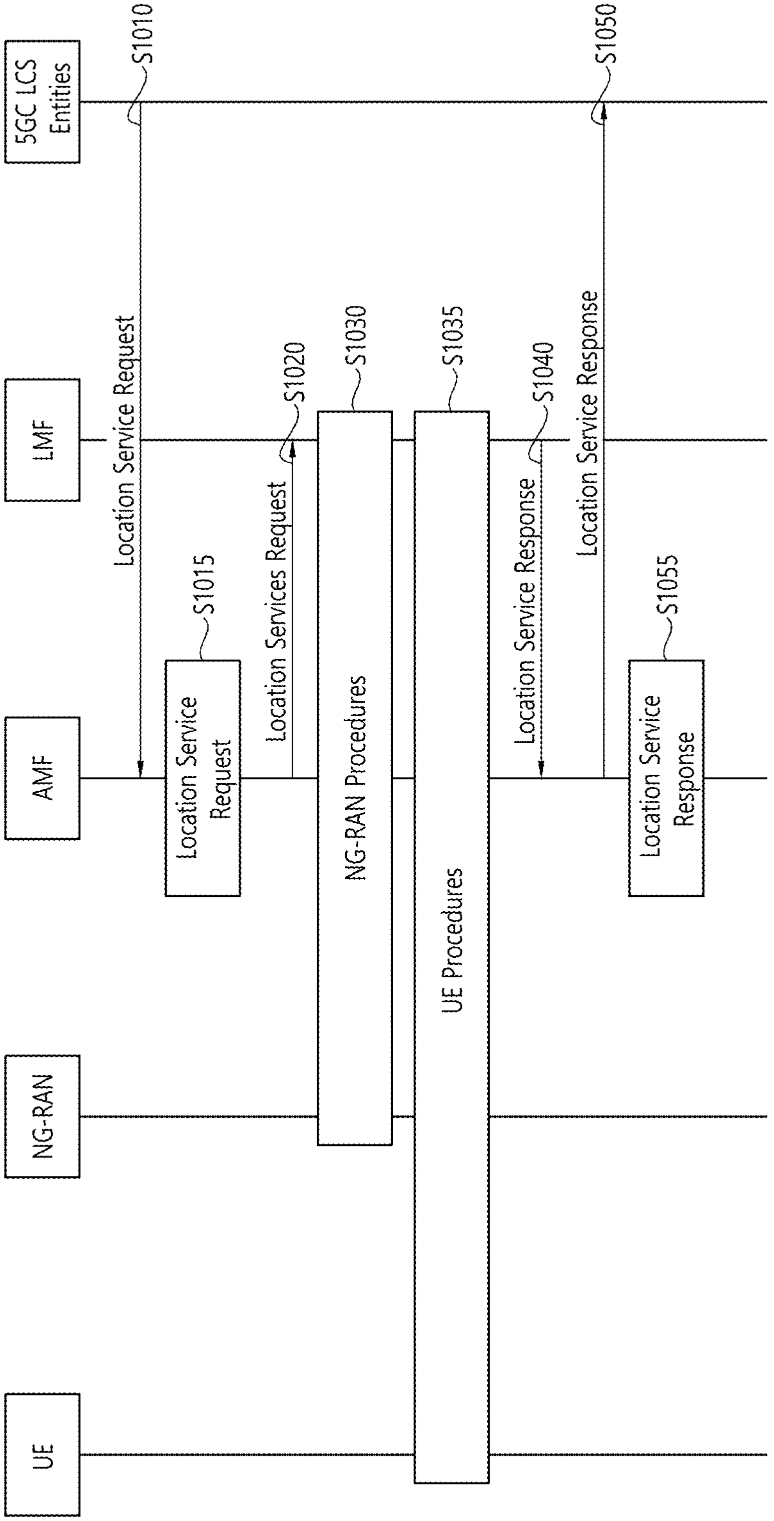
FIG. 10 shows an implementation example of a network for measuring a position of a UE, according to an embodiment of the present disclosure.

FIG. 10 shows an implementation example of a network for measuring a position of a UE, according to an embodiment of the present disclosure. The embodiment of FIG. 10 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 10. That is, it may be assumed in FIG. 10 that the UE is in a connected mode. However, due to signaling and data inactivation or the like, the signaling connection may be released by NG-RAN while a positioning process is performed.

A network operation process for measuring a position of a UE will be described in detail with reference to FIG. 10. In step S1010, a 5GC entity such as GMLC may request a serving AMF to provide a location service for measuring a position of a target UE. However, even if the GMLC does not request for the location service, based on step S1015, the serving AMF may determine that the location service for measuring the position of the target UE is required. For example, to measure the position of the UE for an emergency call, the serving AMF may determine to directly perform the location service.

Thereafter, the AMF may transmit the location service request to an LMF based on step S1020, and the LMF may start location procedures to obtain position measurement data or position measurement assistance data together with a serving ng-eNB and a serving gNB, according to step S1030. Additionally, based on step S1035, the LMF may start location procedures for downlink positioning together with the UE. For example, the LMF may transmit assistance data defined in 3GPP TS 36.355, or may obtain a position estimation value or a position measurement value. Meanwhile, step S1035 may be performed additionally after step S1030 is performed, or may be performed instead of step S1030.

In step S1040, the LMF may provide a location service response to the AMF. In addition, the location service response may include information on whether position estimation of the UE is successful and a position estimation value of the UE. Thereafter, if the procedure of FIG. 10 is initiated by step S1010, in step S1050, the AMF may transfer the location service response to a 5GC entity such as GMLC, and if the procedure of FIG. 10 is initiated by step S1015, in step S1055, the AMF may use the location service response to provide a location service related to an emergency call or the like.

Figure 11:
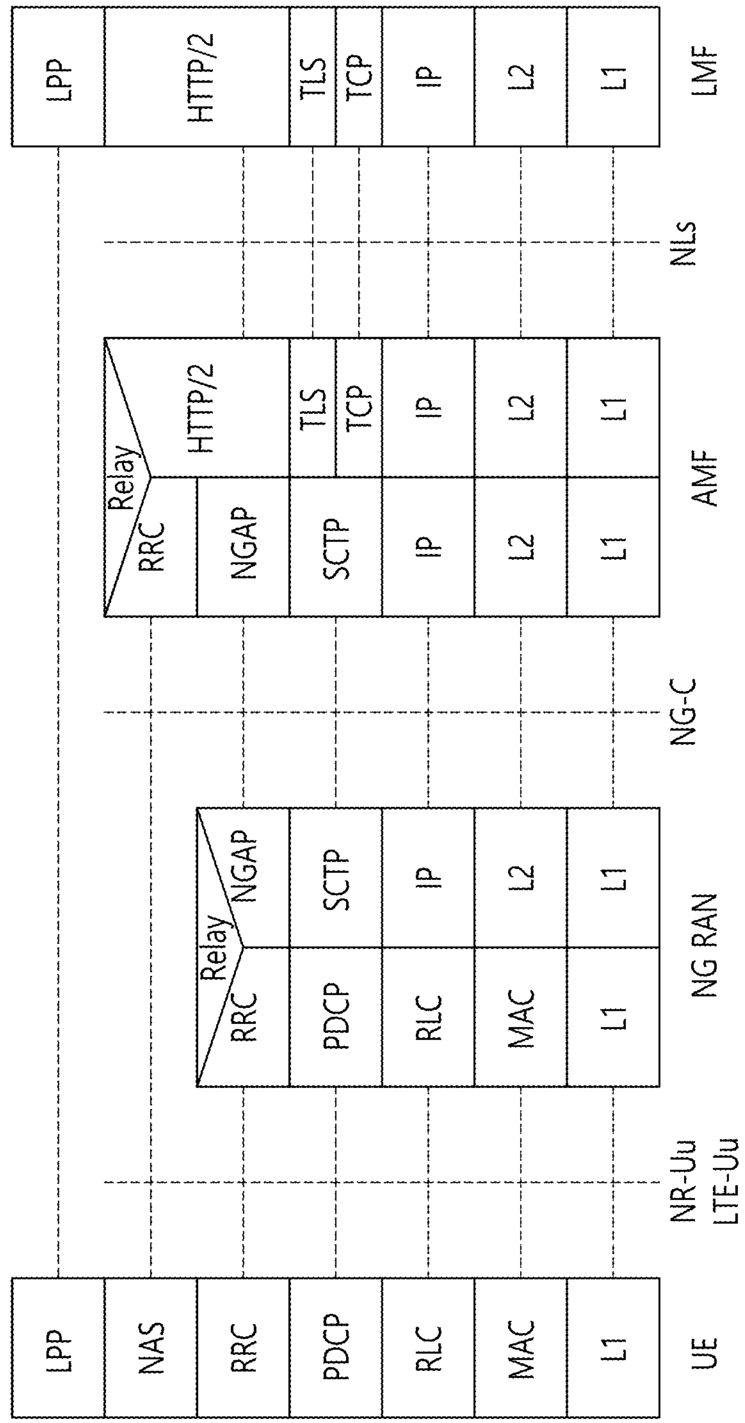
FIG. 11 shows an example of a protocol layer used to support LTE Positioning Protocol (LPP) message transmission between an LMF and a UE, according to an embodiment of the present disclosure.

FIG. 11 shows an example of a protocol layer used to support LTE Positioning Protocol (LPP) message transmission between an LMF and a UE, according to an embodiment of the present disclosure. The embodiment of FIG. 11 may be combined with various embodiments of the present disclosure.

An LPP PDU may be transmitted through a NAS PDU between an AMF and the UE. Referring to FIG. 11, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 12:
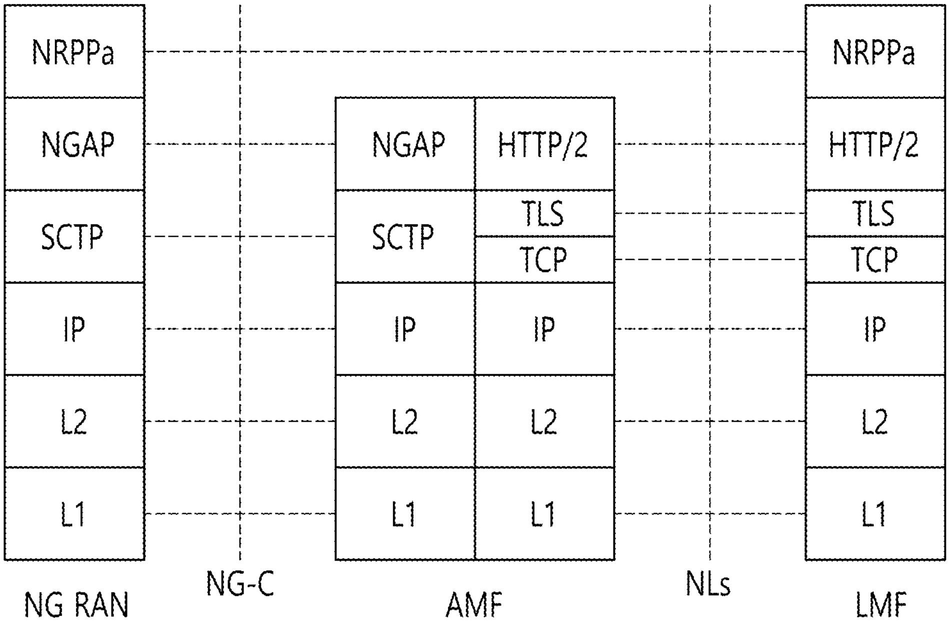
FIG. 12 shows an example of a protocol layer used to support NR Positioning Protocol A (NRPPa) PDU transmission between an LMF and an NG-RAN node, according to an embodiment of the present disclosure.

FIG. 12 shows an example of a protocol layer used to support NR Positioning Protocol A (NRPPa) PDU transmission between an LMF and an NG-RAN node, according to an embodiment of the present disclosure. The embodiment of FIG. 12 may be combined with various embodiments of the present disclosure.

Referring to FIG. 12, the NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., position measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference of Arrival)

Figure 13:
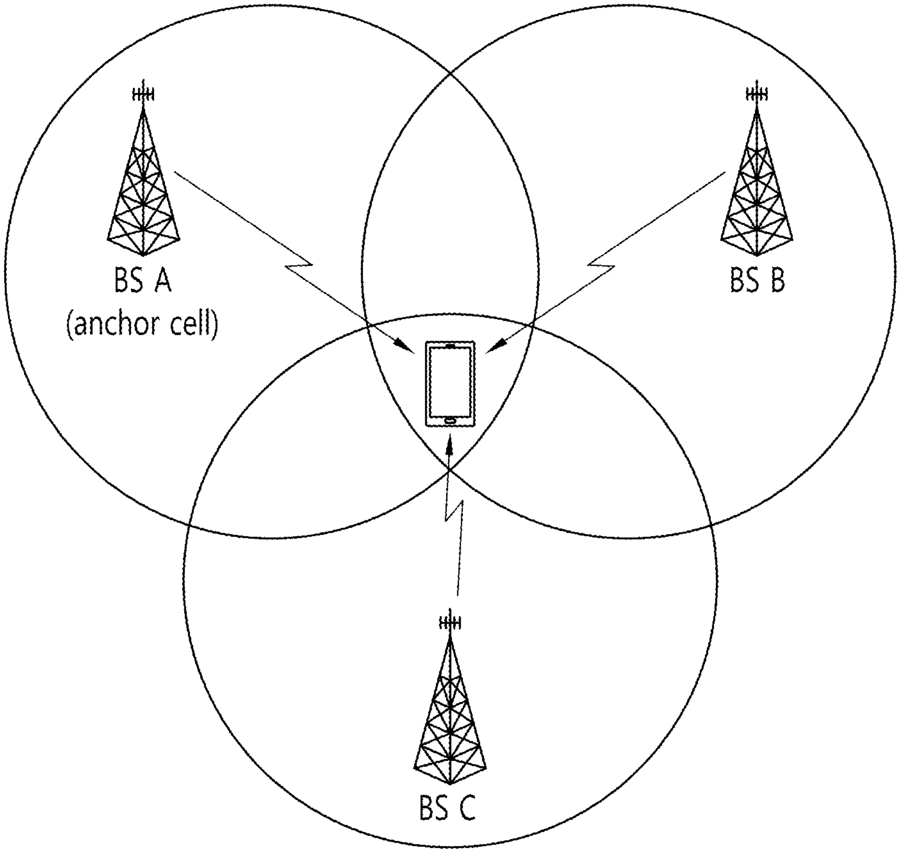
FIG. 13 shows an Observed Time Difference Of Arrival (OTDOA) positioning method according to an embodiment of the present disclosure.

FIG. 13 shows an Observed Time Difference Of Arrival (OTDOA) positioning method according to an embodiment of the present disclosure. The embodiment of FIG. 13 may be combined with various embodiments of the present disclosure.

Referring to FIG. 13, the OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a position of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a position of a UE. In this case, since accuracy and/or uncertainty for each TOA measurement may be present, the estimated position of the UE may be known as a specific range based on measurement uncertainty.

For example, RSTD for two TPs may be calculated based on Equation 1.

$$RSTDi,1 = \frac{\sqrt{(x_t - x_i)^2 + (y_t - y_i)^2}}{c} - \frac{\sqrt{(x_t - x_i)^2 + (y_t - y_i)^2}}{c} + (T_i - T_1) + (n_i - n_1) \quad \text{[Equation 1]}$$

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti-T1) may be referred to as “real time differences (RTDs)” as a transmission time offset between two TPs, and ni, n1 may represent values related to UE TOA measurement errors.

(2) E-CID (Enhanced Cell ID)

In a cell ID (CID) positioning method, a position of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE position estimation value. In the E-CID positioning method, although some of the measurement methods which are the same as those used in a measurement control system of an RRC protocol may be used, additional measurement is not performed in general only for position measurement of the UE. In other words, a measurement configuration or a measurement control message may not be provided additionally to measure the position of the UE. Also, the UE may not expect that an additional measurement operation only for position measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+ (UE E-UTRA Rx-Tx time difference)

TADV Type 2=ng-eNB Rx-Tx time difference

Meanwhile, AoA may be used to measure a direction of the UE. The AoA may be defined as an estimation angle with respect to the position of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a position of a UE by estimating an arrival time of SRS. When calculating an estimated SRS arrival time, the position of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

(4) RTT (Round Trip Time)

RTT is a positioning technology that may measure the distance between two entities even if the target entity and the server entity are out of time synchronization. If RTT is performed with multiple server entities, the distances from each server entity may be measured separately. And, by drawing a circle using the measured distances from each server entity, absolute positioning for the target entity may be performed by the point where each circle intersects. For example, it may be referred to as multi-RTT.

The RTT between two entities can be performed as follows. Entity #1 may transmit PRS #1 at t1, and Entity #2 may receive the RRS #1 at t2. After the PRS #1 is received by the Entity #2, Entity #2 may transmit PRS #2 at t3, and Entity #1 may receive the PRS #2 at t4. In this case, the distance D between the two entities can be derived as follows.

$$D = c \times \{(t4 - t1) - (t3 - t2)\}/2 \quad \text{[Equation 2]}$$

(Here, C is the speed of light)

For RTT between UE and gNB, the distance between UE and gNB can be derived based on Equation 2 above using the UE Rx-Tx time difference and gNB Rx-Tx time difference in the table below.

(5) Double-Side RTT

Double-side RTT is a positioning technology that can measure the distance between two entities even when there is a sampling clock frequency offset between the target and server entities.

Figure 14:
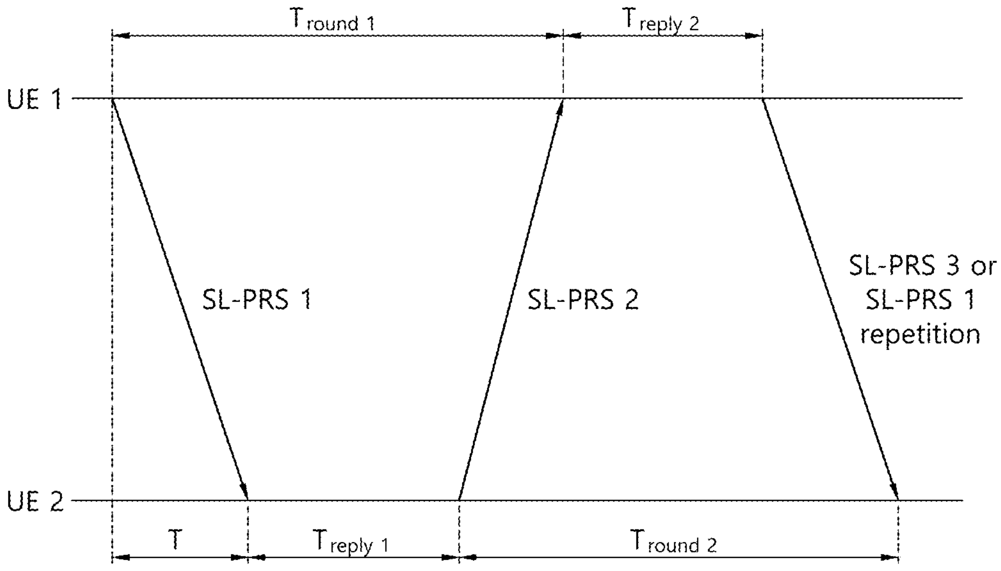
FIG. 14 shows a double-side RTT, according to one embodiment of the present disclosure.

The method for performing a double-sided RTT between two entities is as follows, FIG. 14 shows a double-side RTT, according to one embodiment of the present disclosure. The embodiment of FIG. 14 may be combined with various embodiments of the present disclosure.

Double-side RTT is widely used in ultra-wideband (UWB) positioning and may reduce the impact of clock errors. Referring to FIG. 14, the propagation delay T may be estimated from two measurement values (i.e., Tround1, Tround2, Treply1, Treply2). For example, the propagation delay T may be estimated based on Equation 3.

$$\hat{T} = \frac{1}{2}(T_{round1} - T_{reply1}) \quad \text{[Equation 3]}$$

$$\hat{T} = \frac{1}{2}(T_{round2} - T_{reply2})$$

And, $T_{round1} * T_{round2} - T_{reply1} * T_{reply2}$ may be obtained based on Equation 4.

$$T_{round1} \times T_{round2} - T_{reply1} \times T_{reply2} = 4\hat{T}^2 + 2\hat{T}(T_{reply1} + T_{reply2}) = \hat{T}(T_{round1} + T_{round2} + T_{reply1} + T_{reply2}) \quad \text{[Equation 4]}$$

Where $$T_{round1} \times T_{round2} = (2\hat{T} + T_{reply1})(2\hat{T} + T_{reply2}) = 4\hat{T}^2 + 2\hat{T}(T_{reply1} + T_{reply2}) + T_{reply1} \times T_{reply2}$$

Accordingly, the propagation delay T may be estimated as Equation 5.

$$\hat{T} = \frac{T_{round1} \times T_{round2} - T_{reply1} \times T_{reply2}}{(T_{round1} + T_{round2} + T_{reply1} + T_{reply2})} \quad \text{[Equation 5]}$$

In this case, the propagation delay estimation error due to clock error can be obtained based on Equation 6.

$$\text{error} = \hat{T} - T \approx \frac{(e_{UE1} + e_{UE2})}{2}\hat{T} \quad \text{[Equation 6]}$$

where $e_{UE1}$ and $e_{UE2}$ is the clock offset of UE1 and UE 2;

$\hat{T}$ is estimated propagation delay between UE 1 and UE 2.

Table 9 shows an example of a reference signal time difference (RSTD). The RSTD in Table 8 may be applied for SL positioning.

TABLE 9

| | |
|---|---|
| Definition | The relative timing difference between the E-UTRA neighbour cell j and the E-UTRA reference cell i, defined as $T_{SubframeRxj} - T_{SubframeRxi}$, where: $T_{SubframeRxj}$ is the time when the UE receives the start of one subframe from E-UTRA cell j $T_{SubframeRxi}$ is the time when the UE receives the corresponding start of one subframe from E-UTRA cell i that is closest in time to the subframe received from E-UTRA cell j. The reference point for the observed subframe time difference shall be the antenna connector of the UE. |
| Applicable for | RRC_CONNECTED inter-RAT |

Table 10 shows an example of the DL PRS reference signal received power (RSRP). The DL PRS RSRP in Table 10 may be applied for SL positioning.

TABLE 10

| | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth.<br>For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency,<br>RRC_CONNECTED inter-frequency |

Table 11 shows an example of a DL relative signal time difference (RSTD). The DL RSTD in Table 11 may be applied for SL positioning.

TABLE 11

| | |
|---|---|
| Definition | DL reference signal time difference (DL RSTD) the positioning node j and the reference positioning node i, is defined as $T_{SubframeRxj} - T_{SubframeRxi}$,<br>Where:<br>$T_{SubframeRxj}$ is the time when the UE receives the start of one subframe from positioning node j.<br>$T_{SubframeRxi}$ is the time when the UE receives the corresponding start of one subframe from positioning node i that is closest in time to the subframe received from positioning node j.<br>Multiple DL PRS resources can be used to determine the start of one subframe from a positioning node.<br>For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency,<br>RRC_CONNECTED inter-frequency |

Table 12 shows an example of a UE Rx-Tx time difference. The UE Rx-Tx time difference in Table 12 may be applied for SL positioning.

TABLE 12

| | |
|---|---|
| Definition | The UE Rx − Tx time difference is defined as $T_{UE\text{-}RX} - T_{UE\text{-}TX}$<br>Where:<br>$T_{UE\text{-}RX}$ is the UE received timing of downlink subframe #i from a positioning node, defined by the first detected path in time.<br>$T_{UE\text{-}TX}$ is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for $T_{UE\text{-}RX}$ measurement shall be the Rx antenna connector of the UE and the reference point for $T_{UE\text{-}TX}$ measurement shall be the Tx antenna connector of the UE. For frequency range 2, the reference point for $T_{UE\text{-}RX}$ measurement shall be the Rx antenna of the UE and the reference point for $T_{UE\text{-}TX}$ measurement shall be the Tx antenna of the UE. |

TABLE 12-continued

| | |
|---|---|
| Applicable for | RRC_CONNECTED intra-frequency,<br>RRC_CONNECTED inter-frequency |

Table 13 shows an example of a UL Relative Time of Arrival (UL RTOA) (TUL-RTOA). The UL RTOA in Table 13 may be applied for SL positioning.

TABLE 13

| | |
|---|---|
| Definition | [The UL Relative Time of Arrival ($T_{UL-RTOA}$) is the beginning of subframe i containing SRS received in positioning node j, relative to the configurable reference time.]<br>Multiple SRS resources for positioning can be used to determine the beginning of one subframe containing SRS received a positioning node.<br>The reference point for $T_{UL-RTOA}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector. |

Table 14 shows an example of a gNB Rx-Tx time difference. The gNB Rx-Tx time difference in Table 14 may be applied for SL positioning.

TABLE 14

| | |
|---|---|
| Definition | The gNB Rx − Tx time difference is defined as $T_{gNB-RX} - T_{gNB-TX}$<br>Where:<br>$T_{gNB-RX}$ is the positioning node received timing of uplink subframe #i containing SRS associated with UE, defined by the first detected path in time.<br>$T_{gNB-TX}$ is the positioning node transmit timing of downlink subframe #j that is closest in time to the subframe #i received from the UE.<br>Multiple SRS resources for positioning can be used to determine the start of one subframe containing SRS.<br>The reference point for $T_{gNB-RX}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector.<br>The reference point for $T_{gNB-TX}$ shall be:<br>for type 1-C base station TS 38.104 [9]: the Tx antenna connector,<br>for type 1-O or 2-O base station TS 38.104 [9]: the Tx antenna,<br>for type 1-H base station TS 38.104 [9]: the Tx Transceiver Array Boundary connector. |

Table 15 shows an example of a UL Angle of Arrival (AoA). The UL AoA in Table 15 may be applied for SL positioning.

TABLE 15

| | |
|---|---|
| Definition | UL Angle of Arrival (UL AoA) is defined as the estimated azimuth angle and vertical angle of a UE with respect to a reference direction, wherein the reference direction is defined:<br>In the global coordinate system (GCS), wherein estimated azimuth angle is measured relative to geographical North and is positive in a counter-clockwise direction and estimated vertical angle is measured relative to zenith and positive to horizontal direction<br>In the local coordinate system (LCS), wherein estimated azimuth angle is measured relative to x-axis of LCS and positive in a counter-clockwise direction and estimated vertical angle is measured relative to z-axis of LCS and positive to x-y plane direction. The bearing, downtilt and slant angles of LCS are defined according to TS 38.901 [15].<br>The UL-AoA is determined at the gNB antenna for an UL channel corresponding to this UE. |

Table 16 shows an example of the UL SRS reference signal received power (RSRP). The UL SRS RSRP in Table 16 may be applied for SL positioning.

TABLE 16

| | |
|---|---|
| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions. |

TABLE 16-continued

| |
|---|
| For frequency range 1 and 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |

Various embodiments of the present disclosure may be applied based on Tables 17 through 32.

TABLE 17

3GPP TS 36.213 V16.2.0

14.1.1.6 UE procedure for determining the subset of resources to be reported to higher layers in PSSCH resource selection in sidelink transmission mode 4 and in sensing measurement in sidelink transmission mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$ $P_{rsvp\_TX}$ and $prio_{TX}$ are all provided by higher layers (described in [11]). $C_{resel}$ is determined by $C_{resel}$ = 10*SL_RESOURCE_RESELECTION_COUNTER, where SL_RESOURCE_RESELECTION_COUNTER is provided by higher layers [11].

. . .

If partial sensing is configured by higher layers then the following steps are used:

1) A candidate single-subframe resource for PSSCH transmission $R_{x,y}$ is defined as a set of $L_{subCH}$ contiguous sub−channels with sub−channel x + j in subframe $t_y^{SL}$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k\times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i = (a − 1) * 8 + b.

TABLE 18

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prioTX,prioRX}$.

the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+y\times P'_{rsvp\_TX}}$ for $q = 1, 2, \ldots, Q$ and $j = 0, 1, \ldots, C_{resel} - 1$. Here, $$Q = \frac{1}{P_{rsvp\_RX}} \text{ if } P_{rsvp\_RX} < 1 \text{ and } y' - m \le P_{step} \times P_{rsvp\_RX} + P_{step}, \text{ where } t_{y'}^{SL}$$

is the last subframe of the Y subframes , and Q = 1 otherwise.

6) If the number of candidate single-subframe resources remaining in the set $S_A$ is smaller than $0.2 \cdot M_{total}$, then Step 4 is repeated with $Th_{a,b}$ increased by 3 dB.

TABLE 18-continued

7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH} - 1$ in the monitored subframes in Step 2 that can be expressed by $t^{SL}_{y-P_{step}*j}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

TABLE 19

If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub−channels with sub−channel x + j in subframe $t^{SL}_y$ where $j = 0, \ldots, L_{subCH} - 1$. The UE shall assume that any set of $L_{subCH}$ contiguous sub-channels included in the corresponding PSSCH resource pool (described in 14.1.5) within the time interval [n + $T_1$, n + $T_2$] corresponds to one candidate single-subframe resource, where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$ UE selection of $T_2$ shall fulfil the latency requirement. The total number of the candidate single-subframe resources is denoted by $M_{total}$.

2) The set $S_A$ is initialized to the union of all the candidate single-subframe resources. The set $S_B$ is initialized to an empty set.

3) The UE moves the candidate single-subframe resource $R_{x,y}$ from the set $S_A$ to $S_B$.

4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

TABLE 20

3GPP TS 38.214 V16.7.0

UE procedure for determining the subset of resources to be reported to higher layers in PSSCH resource selection in sidelink resource allocation mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp\_TX}$, in units of msec.
if the higher layer requests the UE to determine a subset of resources from which the higher layer will select resources for PSSCH/PSCCH transmission as part of re-evaluation or pre-emption procedure, the higher layer provides a set of resources ($r_0$, $r_1$, $r_2$, . . . ) which may be subject to re-evaluation and a set of resources ($r'_0, r'_1, r'_2, \ldots$) which may be subject to pre−emption.

it is up to UE implementation to determine the subset of resources as requested by higher layers before or after the slot $r''_i - T_3$, where $r''_i$ is the slot with the smallest slot index among $(r_0, r_1, r_2, \ldots)$ and $(r'_0, r'_1, r'_2, \ldots)$.

and $T_3$ is equal to $T^{SL}_{proc,1}$, where $T^{SL}_{proc,1}$ is defined in slots in Table 8.1.4−2 where $\mu_{SL}$ is the SCS configuration of the SL BWP.

The following higher layer parameters affect this procedure:

sl-Selection WindowList: internal parameter $T_{2min}$ is set to the corresponding value from higher layer parameter sl-Selection Window List for the given value of $prio_{TX}$.
sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.
sl-RS-ForSensing selects if the UE uses the PSSCH-RSRP or PSCCH-RSRP measurement, as defined in clause 8.4.2.1.

TABLE 20-continued

| 3GPP TS 38.214 V16.7.0 |
| --- |
| sl-ResourceReservePeriodList<br>sl-Sensing Window: internal parameter $T_0$ is defined as the number of slots corresponding to sl-Sensing Window msec<br>sl-TxPercentageList: internal parameter X for a given $prio_{TX}$ is defined as sl-TxPercentageList ($prio_{TX}$) converted from percentage to ratio<br>sl-PreemptionEnable: if sl-PreemptionEnable is provided, and if it is not equal to 'enabled', internal parameter $prio_{pre}$ is set to the higher layer provided parameter sl-PreemptionEnable<br>The resource reservation interval, $P_{rsvp\_TX}$, if provided, is converted from units of msec to units of logical slots, resulting in $P'_{rsvp\_TX}$ according to clause 8.1.7.<br><br>Notation:<br>$(t'^{SL}_0, t'^{SL}_1, t'^{SL}_2, \ldots)$ denotes the set of slots which belongs to the sidelink resource pool and is defined in Clause 8.<br><br>The following steps are used:<br>1) A candidate single-slot resource for transmission $R_{x,y}$ is defined as a set of $L_{subCH}$ contiguous sub-channels with sub-channel $x + j$ in slot $t'^{SL}_y$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where<br>selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;<br>if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).<br>The total number of candidate single-slot resources is denoted by $M_{total}$.<br><br>2) The sensing window is defined by the range of slots $[n - T_0, n - T^{SL}_{proc,0})$ where $T_0$ is defined above and $T^{SL}_{proc,0}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.<br>3) The internal parameter $Th(p_i, p_j)$ is set to the corresponding value of RSRP threshold indicated by the i-th field in sl-Thres-RSRP-List, where $i = p_i + (p_j - 1) * 8$. |

TABLE 21

| | |
| --- | --- |
| 4) | The set $S_A$ is initialized to the set of all the candidate single-slot resources. |
| 5) | The UE shall exclude any candidate single-slot resource $R_{x,y}$ from the set $S_A$ if it meets all the following conditions:<br>the UE has not monitored slot $t'^{SL}_m$ in Step 2.<br>for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met. |
| 5a) | If the number of candidate single-slot resources $R_{x,y}$ remaining in the set $S_A$ is smaller than $X \cdot M_{total}$, the set $S_A$ is initialized to the set of all the candidate single-slot resources as in step 4. |
| 6) | The UE shall exclude any candidate single-slot resource $R_{x,y}$ from the set $S_A$ if it meets all the following conditions:<br>a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];<br>b) the RSRP measurement performed, according to clause 8.4.2.1 for the received SCI format 1-A, is higher than $Th(prio_{RX}, prior_{TX})$;<br>c) the SCI format received in slot $t'^{SL}_m$ or the same SCI format which, if and only if the 'Resource reservation period' field is present in the received SCI format 1-A, is assumed to be received in slot(s) $t'^{SL}_{m+q\times P'_{rsvp\_RX}}$ determines according to clause 8.1.5 the set of resource blocks and slots which overlaps with $R_{x,y+j\times P'_{rsvp\_TX}}$ for $q = 1, 2, \ldots, Q$ and $j = 0, 1, \ldots, C_{resel} - 1$. Here, $P'_{rsvp\_RX}$ is $P_{rsvp\_RX}$ converted to units of logical slots according to clause 8.1.7, $Q = \left\lceil \frac{T_{scal}}{P_{rsvp\_RX}} \right\rceil$ if $P_{rsvp\_RX} < T_{scal}$ and $n' - m \le P'_{rsvp\_RX}$, where $t'^{SL}_{n'} = n$ if slot n belongs to the set $(t'^{SL}_0, t'^{SL}_1, \ldots, t'^{SL}_{T'_{max}-1})$, otherwise slot $t'^{SL}_{n'}$ is the first slot after slot n belonging to |

TABLE 21-continued

| |
|---|
| the set $(t'^{SL}_0, t'^{SL}_1, \ldots, t'^{SL}_{T'_{max}-1})$; otherwise Q = 1. $T_{scal}$ is set to selection window size $T_2$ converted to units of msec.<br>7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.<br>The UE shall report set $S_A$ to higher layers.<br>If a resource $r'_i$ from the set $(r'_0, r'_1, r'_2, \ldots)$ meets the conditions below then the UE shall report pre−emption of the resource $r'_1$ to higher layers<br>$r'_i$ is not a member of $S_A$, and<br>$r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions:<br>sl-PreemptionEnable is provided and is equal to 'enabled' and $prio_{TX} > prio_{RX}$<br>sl-PreemptionEnable is provided and is not equal to 'enabled', and $prio_{RX} < prio_{pre}$ and $prio_{TX} > prio_{RX}$ |

For example, Table 22 shows T^SL_proc,0 according to SCS.

TABLE 22

| $\mu_{SL}$ | $T_{proc,0}^{SL}$ [slots] |
|---|---|
| 0 | 1 |
| 1 | 1 |
| 2 | 2 |
| 3 | 4 |

For example, Table 23 shows T^SL_proc,1 according to SCS.

TABLE 23

| $\mu_{SL}$ | $T_{proc,1}^{SL}$ [slots] |
|---|---|
| 0 | 3 |
| 1 | 5 |
| 2 | 9 |
| 3 | 17 |

TABLE 24

| 3GPP TS 37.355 V16.7.0 (2021-12) |
|---|
| - NR-DL-PRS-AssistanceData<br>The IE NR-DL-PRS-AssistanceData is used by the location server to provide DL-PRS assistance data.<br>NOTE 1: The location server should include at least one TRP for which the SFN can be obtained by the target device, e.g. the serving TRP.<br>NOTE 2: The nr-DL-PRS-ReferenceInfo defines the “assistance data reference” TRP whose DL-PRS configuration is included in nr-DL-PRS-AssistanceDataList. The nr-DL-PRS-SFN0-Offset’s and nr-DL-PRS-expectedRSTD’s in nr-DL-PRS-AssistanceDataList are provided relative to the “assistance data reference” TRP.<br>NOTE 3: The network signals a value of zero for the nr-DL-PRS-SFN0-Offset, nr-DL-PRS-expectedRSTD, and nr-DL-PRS-expectedRSTD-uncertainty of the “assistance data reference” TRP in nr-DL-PRS-AssistanceDataList.<br>NOTE 4: For NR DL-TDOA positioning (see clause 6.5.10) the nr-DL-PRS-ReferenceInfo defines also the requested “RSTD reference”.<br>For DL-PRS processing, the LPP layer may inform lower layers to start performing DL-PRS measurements and provide to lower layers the information about the location of DL-PRS, e.g. DL-PRS-PointA, DL-PRS Positioning occasion information.<br>-- ASN1START<br>NR-DL-PRS-AssistanceData-r16 ::= SEQUENCE {<br>nr-DL-PRS-ReferenceInfo-r16 DL-PRS-ID-Info-r16,<br>nr-DL-PRS-AssistanceDataList-r16 SEQUENCE (SIZE (1..nrMaxFreqLayers-r16)) OF<br>NR-DL-PRS-AssistanceDataPerFreq-r16,<br>nr-SSB-Config-r16 SEQUENCE (SIZE (1..nrMaxTRPs-r16)) OF<br>NR-SSB-Config-r16 OPTIONAL, -- Need ON<br>... 3GPP<br>3GPP TS 37.355 V16.7.0 (2021-12) 60 Release 16<br>}<br>NR-DL-PRS-AssistanceDataPerFreq-r16 ::= SEQUENCE {<br>nr-DL-PRS-PositioningFrequencyLayer-r16<br>NR-DL-PRS-PositioningFrequencyLayer-r16,<br>nr-DL-PRS-AssistanceDataPerFreq-r16 SEQUENCE (SIZE (1..nrMaxTRPsPerFreq-r16)) OF<br>NR-DL-PRS-AssistanceDataPerTRP-r16,<br>...<br>}<br>NR-DL-PRS-AssistanceDataPerTRP-r16 ::= SEQUENCE {<br>dl-PRS-ID-r16 INTEGER (0..255),<br>nr-PhysCellID-r16 NR-PhysCellID-r16 OPTIONAL, -- Need ON<br>nr-CellGlobalID-r16 NCGI-r15 OPTIONAL, -- Need ON<br>nr-ARFCN-r16 ARFCN-ValueNR-r15 OPTIONAL, -- Need ON<br>nr-DL-PRS-SFN0-Offset-r16 NR-DL-PRS-SFN0-Offset-r16, |

TABLE 24-continued

| 3GPP TS 37.355 V16.7.0 (2021-12) |
|---|
| nr-DL-PRS-ExpectedRSTD-r16 INTEGER (-3841..3841),<br>nr-DL-PRS-ExpectedRSTD-Uncertainty-r16<br>INTEGER (0..246),<br>nr-DL-PRS-Info-r16 NR-DL-PRS-Info-r16,<br>...,<br>[[<br>prs-OnlyTP-r16 ENUMERATED { true } OPTIONAL -- Need ON<br>]]<br>}<br>NR-DL-PRS-PositioningFrequencyLayer-r16 ::= SEQUENCE {<br>dl-PRS-SubcarrierSpacing-r16 ENUMERATED {kHz15, kHz30, kHz60, kHz120, ...},<br>dl-PRS-ResourceBandwidth-r16 INTEGER (1..63),<br>dl-PRS-StartPRB-r16 INTEGER (0..2176),<br>dl-PRS-PointA-r16 ARFCN-ValueNR-r15,<br>dl-PRS-CombSizeN-r16 ENUMERATED {n2, n4, n6, n12, ...},<br>dl-PRS-CyclicPrefix-r16 ENUMERATED {normal, extended, ...},<br>...<br>}<br>NR-DL-PRS-SFN0-Offset-r16 ::= SEQUENCE {<br>sfn-Offset-r16 INTEGER (0..1023),<br>integerSubframeOffset-r16 INTEGER (0..9),<br>...} |

TABLE 25

NR-DL-PRS-AssistanceData field descriptions
nr-DL-PRS-ReferenceInfo
This field specifies the IDs of the assistance data reference TRP.
nr-DL-PRS-AssistanceDataList
This field specifies the DL-PRS resources for each frequency layer.
nr-SSB-Config
This field specifies the SSB configuration of the TRPs.
nr-DL-PRS-PositioningFrequencyLayer
This field specifies the Positioning Frequency Layer for the nr-DL-PRS-AssistanceDataPerFreq field.
nr-DL-PRS-AssistanceDataPerFreq
This field specifies the DL-PRS Resources for the TRPs within the Positioning Frequency Layer.
dl-PRS-ID
This field is used along with a DL-PRS Resource Set ID and a DL-PRS Resource ID to uniquely identify a DL-PRS Resource, and is associated with a single TRP.
nr-PhysCellID
This field specifies the physical cell identity of the TRP. When the field prs-OnlyTP is included, this field is not included.
nr-CellGlobalID
This field specifies the NCGI, the globally unique identity of a cell in NR, as defined in TS 38.331 [35]. When the field prs-OnlyTP is included, this field is not included.
nr-ARFCN
This field specifies the NR-ARFCN of the TRP's CD-SSB (as defined in TS 38.300 [47]) corresponding to nr-PhysCellID. When the field prs-OnlyTP is included, this field is not included.
- NR-DL-PRS-Info
The IE NR-DL-PRS-Info defines downlink PRS configuration.

```
-- ASN1START
NR-DL-PRS-Info-r16 ::= SEQUENCE {
nr-DL-PRS-ResourceSetList-r16 SEQUENCE (SIZE (1..nrMaxSetsPerTrpPerFreqLayer-r16)) OF
NR-DL-PRS-ResourceSet-r16,
...
}
NR-DL-PRS-ResourceSet-r16 ::= SEQUENCE {
nr-DL-PRS-ResourceSetID-r16 NR-DL-PRS-ResourceSetID-r16,
dl-PRS-Periodicity-and-ResourceSetSlotOffset-r16
NR-DL-PRS-Periodicity-and-ResourceSetSlotOffset-r16,
dl-PRS-ResourceRepetitionFactor-r16 ENUMERATED {n2, n4, n6, n8, n16, n32, ...}
OPTIONAL, -- Need OP
dl-PRS-ResourceTimeGap-r16 ENUMERATED {s1, s2, s4, s8, s16, s32, ...}
OPTIONAL, -- Cond Rep
dl-PRS-NumSymbols-r16 ENUMERATED {n2, n4, n6, n12, ...},
dl-PRS-MutingOption1-r16 DL-PRS-MutingOption1-r16 OPTIONAL, -- Need OP
dl-PRS-MutingOption2-r16 DL-PRS-MutingOption2-r16 OPTIONAL, -- Need OP
dl-PRS-ResourcePower-r16 INTEGER (−60..50),
dl-PRS-ResourceList-r16 SEQUENCE (SIZE (1..nrMaxResourcesPerSet-r16)) OF
NR-DL-PRS-Resource-r16,
...
}
```

TABLE 25-continued

```
DL-PRS-MutingOption1-r16 ::= SEQUENCE {
dl-prs-MutingBitRepetitionFactor-r16
ENUMERATED { n1, n2, n4, n8, ... } OPTIONAL, -- Need OP
nr-option1-muting-r16 NR-MutingPattern-r16,
...
}
DL-PRS-MutingOption2-r16 ::= SEQUENCE {
nr-option2-muting-r16 NR-MutingPattern-r16,
...
}
NR-MutingPattern-r16 ::= CHOICE {
po2-r16 BIT STRING (SIZE(2)),
po4-r16 BIT STRING (SIZE(4)),
po6-r16 BIT STRING (SIZE(6)),
po8-r16 BIT STRING (SIZE(8)),
po16-r16 BIT STRING (SIZE(16)),
po32-r16 BIT STRING (SIZE(32)),
...
}
```

TABLE 26

```
NR-DL-PRS-Resource-r16 ::= SEQUENCE {
nr-DL-PRS-ResourceID-r16 NR-DL-PRS-ResourceID-r16,
dl-PRS-SequenceID-r16 INTEGER (0.. 4095),
dl-PRS-CombSizeN-AndReOffset-r16 CHOICE {
n2-r16 INTEGER (0..1),
n4-r16 INTEGER (0..3),
n6-r16 INTEGER (0..5),
n12-r16 INTEGER (0..11),
...
},
dl-PRS-ResourceSlotOffset-r16 INTEGER (0..nrMaxResourceOffsetValue-1-r16),
dl-PRS-ResourceSymbolOffset-r16 INTEGER (0..12),
dl-PRS-QCL-Info-r16 DL-PRS-QCL-Info-r16 OPTIONAL, -- Need ON
...
}
DL-PRS-QCL-Info-r16 ::= CHOICE {
ssb-r16 SEQUENCE {
pci-r16 NR-PhysCellID-r16,
ssb-Index-r16 INTEGER (0..63),
rs-Type-r16 ENUMERATED {typeC, typeD, typeC-plus-typeD}
},
dl-PRS-r16 SEQUENCE {
qcl-DL-PRS-ResourceID-r16 NR-DL-PRS-ResourceID-r16,
qcl-DL-PRS-ResourceSetID-r16 NR-DL-PRS-ResourceSetID-r16
}
}
NR-DL-PRS-Periodicity-and-ResourceSetSlotOffset-r16 ::= CHOICE {
scs15-r16 CHOICE {
n4-r16 INTEGER (0..3),
n5-r16 INTEGER (0..4),
n8-r16 INTEGER (0..7),
n10-r16 INTEGER (0..9),
n16-r16 INTEGER (0..15),
n20-r16 INTEGER (0..19),
n32-r16 INTEGER (0..31),
n40-r16 INTEGER (0..39),
n64-r16 INTEGER (0..63),
n80-r16 INTEGER (0..79),
n160-r16 INTEGER (0..159),
n320-r16 INTEGER (0..319),
n640-r16 INTEGER (0..639),
n1280-r16 INTEGER (0..1279),
n2560-r16 INTEGER (0..2559),
n5120-r16 INTEGER (0..5119),
n10240-r16 INTEGER (0..10239),
...
},
scs30-r16 CHOICE {
n8-r16 INTEGER (0..7),
n10-r16 INTEGER (0..9),
n16-r16 INTEGER (0..15),
n20-r16 INTEGER (0..19),
n32-r16 INTEGER (0..31),
n40-r16 INTEGER (0..39),
n64-r16 INTEGER (0..63),
```

TABLE 26-continued

| |
|---|
| n80-r16 INTEGER (0..79), |
| n128-r16 INTEGER (0..127), |
| n160-r16 INTEGER (0..159), |
| n320-r16 INTEGER (0..319), |
| n640-r16 INTEGER (0..639), |
| n1280-r16 INTEGER (0..1279), |
| n2560-r16 INTEGER (0..2559), |
| n5120-r16 INTEGER (0..5119), |
| n10240-r16 INTEGER (0..10239), |
| n20480-r16 INTEGER (0..20479), |
| ... |
| }, |

TABLE 27

| |
|---|
| scs60-r16 CHOICE { |
| n16-r16 INTEGER (0..15), |
| n20-r16 INTEGER (0..19), |
| n32-r16 INTEGER (0..31), |
| n40-r16 INTEGER (0..39), |
| n64-r16 INTEGER (0..63), |
| n80-r16 INTEGER (0..79), |
| n128-r16 INTEGER (0..127), |
| n160-r16 INTEGER (0..159), |
| n256-r16 INTEGER (0..255), |
| n320-r16 INTEGER (0..319), |
| n640-r16 INTEGER (0..639), |
| n1280-r16 INTEGER (0..1279), |
| n2560-r16 INTEGER (0..2559), |
| n5120-r16 INTEGER (0..5119), |
| n10240-r16 INTEGER (0..10239), |
| n20480-r16 INTEGER (0..20479), |
| n40960-r16 INTEGER (0..40959), |
| ... |
| }, |
| scs120-r16 CHOICE { |
| n32-r16 INTEGER (0..31), |

TABLE 27-continued

| |
|---|
| n40-r16 INTEGER (0..39), |
| n64-r16 INTEGER (0..63), |
| n80-r16 INTEGER (0..79), |
| n128-r16 INTEGER (0..127), |
| n160-r16 INTEGER (0..159), |
| n256-r16 INTEGER (0..255), |
| n320-r16 INTEGER (0..319), |
| n512-r16 INTEGER (0..511), |
| n640-r16 INTEGER (0..639), |
| n1280-r16 INTEGER (0..1279), |
| n2560-r16 INTEGER (0..2559), |
| n5120-r16 INTEGER (0..5119), |
| n10240-r16 INTEGER (0..10239), |
| n20480-r16 INTEGER (0..20479), |
| n40960-r16 INTEGER (0..40959), |
| n81920-r16 INTEGER (0..81919), |
| ... |
| }, |
| ... |
| } |
| -- ASN1STOP |

TABLE 28

| |
|---|
| NR-DL-PRS-Info field descriptions |
| nr-DL-PRS-ResourceSetID |
| This field specifies the DL-PRS Resource Set ID, which is used to identify the DL-PRS Resource Set of the TRP across all the frequency layers. |
| dl-PRS-Periodicity-and-ResourceSetSlotOffset |
| This field specifies the periodicity of DL-PRS allocation in slots configured per DL-PRS Resource Set and the slot offset with respect to SFN #0 slot #0 for a TRP where the DL-PRS Resource Set is configured (i.e. slot where the first DL-PRS Resource of DL-PRS Resource Set occurs). |
| dl-PRS-ResourceRepetitionFactor |
| This field specifies how many times each DL-PRS Resource is repeated for a single instance of the DL-PRS Resource Set. It is applied to all resources of the DL-PRS Resource Set. Enumerated values n2, n4, n6, n8, n16, n32 correspond to 2, 4, 6, 8, 16, 32 resource repetitions, respectively. If this field is absent, the value for dl-PRS-ResourceRepetitionFactor is 1 (i.e., no resource repetition). |
| dl-PRS-ResourceTimeGap |
| This field specifies the offset in units of slots between two repeated instances of a DL-PRS Resource corresponding to the same DL-PRS Resource ID within a single instance of the DL-PRS Resource Set. The time duration spanned by one DL-PRS Resource Set containing repeated DL-PRS Resources should not exceed DL-PRS-Periodicity. |
| dl-PRS-NumSymbols |
| This field specifies the number of symbols per DL-PRS Resource within a slot. |
| dl-PRS-MutingOption1 |
| This field specifies the DL-PRS muting configuration of the TRP for the Option-1 muting, as specified in TS 38.214 [45], and comprises the following sub-fields: |
| - dl-prs-MutingBitRepetitionFactor indicates the number of consecutive instances of the DL-PRS Resource Set corresponding to a single bit of the nr-option1-muting bit map. Enumerated values n1, n2, n4, n8 correspond to 1, 2, 4, 8 consecutive instances, respectively. If this sub-field is absent, the value for dl-prs-MutingBitRepetitionFactor is n1. |
| - nr-option1-muting defines a bitmap of the time locations where the DL-PRS Resource is transmitted (value '1') or not (value '0') for a DL-PRS Resource Set, as specified in TS 38.214 [45]. |
| If this field is absent, Option-1 muting is not in use for the TRP. |
| dl-PRS-MutingOption2 |
| This field specifies the DL-PRS muting configuration of the TRP for the Option-2 muting, as specified in TS 38.214 [45], and comprises the following sub-fields: |
| - nr-option2-muting defines a bitmap of the time locations where the DL-PRS Resource is transmitted (value '1') or not (value '0'). Each bit of the bitmap corresponds to a single repetition of the DL-PRS Resource within an instance of a DL-PRS Resource Set, as specified in TS 38.214 [45]. The size of this bitmap should be the same as the value for dl-PRS-ResourceRepetitionFactor. |
| If this field is absent, Option-2 muting is not in use for the TRP. |

TABLE 28-continued dl-PRS-ResourcePower
This field specifies the average EPRE of the resources elements that carry the PRS in dBm that is used for PRS transmission. The UE assumes constant EPRE is used for all REs of a given DL-PRS resource.
dl-PRS-SequenceID
This field specifies the sequence Id used to initialize cinit value used in pseudo random generator TS 38.211 [41], clause 5.2.1 for generation of DL-PRS sequence for transmission on a given DL-PRS Resource.
dl-PRS-CombSizeN-AndReOffset
This field specifies the Resource Element spacing in each symbol of the DL-PRS Resource and the Resource Element (RE) offset in the frequency domain for the first symbol in a DL-PRS Resource. All DL-PRS Resource Sets belonging to the same Positioning Frequency Layer have the same value of comb size. The relative RE offsets of following symbols are defined relative to the RE Offset in the frequency domain of the first symbol in the DL-PRS Resource according to TS 38.211 [41]. The comb size configuration should be aligned with the comb size configuration for the frequency layer.
dl-PRS-ResourceSlotOffset
This field specifies the starting slot of the DL-PRS Resource with respect to the corresponding DL-PRS-Resource Set Slot Offset.
dl-PRS-ResourceSymbolOffset
This field specifies the starting symbol of the DL-PRS Resource within a slot determined by dl-PRS-ResourceSlotOffset.
dl-PRS-QCL-Info
This field specifies the QCL indication with other DL reference signals for serving and neighbouring cells and comprises the following subfields:
- ssb indicates the SSB information for QCL source and comprises the following sub-fields:
- pci specifies the physical cell ID of the cell with the SSB that is configured as the source reference signal for the DL-PRS. The UE obtains the SSB configuration for the SSB configured as source reference signal for the DL-PRS by indexing to the field nr-SSB-Config with this physical cell identity.
- ssb-Index indicates the index for the SSB configured as the source reference signal for the DL-PRS.
- rs-Type indicates the QCL type.
- dl-PRS indicates the PRS information for QCL source reference signal and comprises the followings sub-fields:
- qcl-DL-PRS-ResourceID specifies DL-PRS Resource ID of the DL-PRS resource used as the source reference signal.
- qcl-DL-PRS-ResourceSetID indicates the DL-PRS Resource Set ID of the DL-PRS Resource Set used as the source reference signal.

TABLE 29

3GPP TS 37.213 V17.0.0 (2021-12)

4 Channel access procedure
4.0 General
Unless otherwise noted, the definitions below are applicable for the following terminologies used in this specification:
- A channel refers to a carrier or a part of a carrier consisting of a contiguous set of resource blocks (RBs) on which a channel access procedure is performed in shared spectrum.
- A channel access procedure is a procedure based on sensing that evaluates the availability of a channel for performing transmissions. The basic unit for sensing is a sensing slot with a duration $T_{sl}$ = 9us. The sensing slot duration $T_{sl}$ is considered to be idle if an eNB/gNB or a UE senses the channel during the sensing slot duration, and determines that the detected power for at least 4us within the sensing slot duration is less than energy detection threshold $X_{Thresh}$. Otherwise, the sensing slot duration $T_{sl}$ is considered to be busy.
- A channel occupancy refers to transmission(s) on channel(s) by eNB/gNB/UE(s) after performing the corresponding channel access procedures in this clause.
- A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25us, the gap duration is counted in the channel occupancy time. A channel occupancy time can be shared for transmission between an eNB/gNB and the corresponding UE(s).
- A DL transmission burst is defined as a set of transmissions from an eNB/gNB without any gaps greater than 16us. Transmissions from an eNB/gNB separated by a gap of more than 16us are considered as separate DL transmission bursts. An eNB/gNB can transmit transmission(s) after a gap within a DL transmission burst without sensing the corresponding channel(s) for availability.
- A UL transmission burst is defined as a set of transmissions from a UE without any gaps greater than 16us. Transmissions from a UE separated by a gap of more than 16 us are considered as separate UL transmission bursts. A UE can transmit transmission(s) after a gap within a UL transmission burst without sensing the corresponding channel(s) for availability.
- A discovery burst refers to a DL transmission burst including a set of signal(s) and/or channel(s) confined within a window and associated with a duty cycle. The discovery burst can be any of the following:
  - Transmission(s) initiated by an eNB that includes a primary synchronization signal (PSS), secondary synchronization signal (SSS) and cell-specific reference signal(s)(CRS) and may include non-zero power CSI reference signals (CSI-RS).
- Transmission(s) initiated by a gNB that includes at least an SS/PBCH block consisting of a primary sy nchronization signal (PSS), secondary synchronization signal (SSS), physical broadcast channel (PBCH) with associ ated demodulation reference signal (DM-RS) and may also include CORESET for PDCCH scheduling PDSCH wit h SIB1, and PDSCH carrying SIB1 and/or non-zero power CSI reference signals (CSI-RS).

TABLE 30

4.1 Downlink channel access procedures

An eNB operating LAA Scell(s) on channel(s) and a gNB performing transmission(s) on channel(s) shall perform the channel access procedures described in this clause for accessing the channel(s) on which the transmission(s) are performed.

In this clause, $X_{Thresh}$ for sensing is adjusted as described in clause 4.1.5 when applicable.

A gNB performs channel access procedures in this clause unless the higher layer parameter ChannelAccessMode-r16 is provided and ChannelAccessMode-r16 =' semistatic'.

4.1.1 Type 1 DL channel access procedures

This clause describes channel access procedures to be performed by an eNB/gNB where the time duration spanned by the sensing slots that are sensed to be idle before a downlink transmission(s) is random. The clause is applicable to the following transmissions:

- Transmission(s) initiated by an eNB including PDSCH/PDCCH/EPDCCH, or
- Any transmission(s) initiated by a gNB.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N = N_{init}$, where $N_{init}$ is a random number uniformly distributed between 0 and $CW_p$, and go to step 4;
2) if N > 0 and the eNB/gNB chooses to decrement the counter, set N = N − 1;
3) sense the channel for an additional sensing slot duration, and if the additional sensing slot duration is idle, go to step 4; else, go to step 5;
4) if N = 0, stop; else, go to step 2.
5) sense the channel until either a busy sensing slot is detected within an additional defer duration $T_d$ or all the sensing slots of the additional defer duration $T_d$ are detected to be idle;
6) if the channel is sensed to be idle during all the sensing slot durations of the additional defer duration $T_d$, go to step 4; else, go to step 5;

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f$ = 16us immediately followed by $m_p$ consecutive sensing slot durations $T_{sl}$, and $T_f$ includes an idle sensing slot duration $T_{sl}$ at start of $T_f$.

$CW_{min,p} \le CW_p \le CW_{max,p}$ is the contention window. $CW_p$ adjustment is described in clause 4.1.4.

$CW_{min,p}$ and $CW_{max,p}$ are chosen before step 1 of the procedure above.

$m_p$, $CW_{min,p}$, and $CW_{max,p}$ are based on a channel access priority class p associated with the eNB/gNB transmission, as shown in Table 4.1.1-1.

An eNB/gNB shall not transmit on a channel for a Channel Occupancy Time that exceeds $T_{m\,cot,p}$ where the channel access procedures are performed based on a channel access priority class p associated with the eNB/gNB transmissions, as given in Table 4.1.1-1.

If an eNB/gNB transmits discovery burst(s) as described in clause 4.1.2 when N > 0 in the procedure above, the eNB/gNB shall not decrement N during the sensing slot duration(s) overlapping with discovery burst(s).

A gNB may use any channel access priority class for performing the procedures above to transmit transmission(s) including discovery burst(s) satisfying the conditions described in this clause.

A gNB shall use a channel access priority class applicable to the unicast user plane data multiplexed in PDSCH for performing the procedures above to transmit transmission(s) including unicast PDSCH with user plane data.

For p = 3 and = 4 , if the absence of any other technology sharing the channel can be guaranteed on a long term basis (e.g. by level of regulation), $T_{m\,cot,p}$ = 10ms, otherwise, $T_{m\,cot,p}$ = 8ms.

For example, Table 31 shows the channel access priority class (CAPC).

TABLE 31

| Channel Access Priority Class (p) | $m_p$ | $CW_{min,p}$ | $CW_{max,p}$ | $T_{mcot,p}$ | allowed $CW_p$sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 32

4.1.1.1 Regional limitations on channel occupancy time

In Japan, if an eNB/gNB has transmitted a transmission after N = 0 in step 4 of the procedure above, the eNB/gNB may transmit the next continuous transmission, for duration of maximum $T_j$ = 4 ms, immediately after sensing the channel to be idle for at least a sensing interval of $T_{js}$ = 34 us and if the total sensing and transmission time is not more than $1000 \cdot T_{mcot} + \left\lceil \frac{T_{mcot}}{T_j} - 1 \right\rceil \cdot T_{js}$ us. The sensing interval $T_{js}$ consists of duration $T_f$ = 16 us immediately followed by two sensing slots and $T_f$ includes an idle sensing slot at start of $T_f$. The channel is considered to be idle for $T_{js}$ if it is sensed to be idle during the sensing slot durations of $T_{js}$.

TABLE 32-continued

| |
|---|
| 4.1.2 Type 2 DL channel access procedures<br>This clause describes channel access procedures to be performed by an eNB/gNB where the time duration spanned by sensing slots that are sensed to be idle before a downlink transmission(s) is deterministic.<br>If an eNB performs Type 2 DL channel access procedures, it follows the procedures described in clause 4.1.2.1.<br>Type 2A channel access procedures as described in clause 4.1.2.1 are only applicable to the following transmission(s) performed by an eNB/gNB:<br>Transmission(s) initiated by an eNB including discovery burst and not including PDSCH where the transmission(s) duration is at most 1 ms, or<br>Transmission(s) initiated by a gNB with only discovery burst or with discovery burst multiplexed with non-unicast information, where the transmission(s) duration is at most 1 ms, and the discovery burst duty cycle is at most 1/20, or<br>Transmission(s) by an eNB/gNB following transmission(s) by a UE after a gap of 25 us in a shared channel occupancy as described in clause 4.1.3.<br>Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.<br>4.1.2.1 Type 2A DL channel access procedures<br>An eNB/gNB may transmit a DL transmission immediately after sensing the channel to be idle for at least a sensing interval $T_{short\_dl}$ = 25 us. $T_{short\_di}$ consists of a duration $T_f$ = 16 us immediately followed by one sensing slot and $T_f$ includes a sensing slot at start of $T_f$. The channel is considered to be idle for $T_{short\_dl}$ if both sensing slots of $T_{short\_dl}$ are sensed to be idle.<br>4.1.2.2 Type 2B DL channel access procedures<br>A gNB may transmit a DL transmission immediately after sensing the channel to be idle within a duration of Tr = 16 us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.<br>4.1.2.3 Type 2C DL channel access procedures<br>When a gNB follows the procedures in this clause for transmission of a DL transmission, the gNB does not sense the channel before transmission of the DL transmission. The duration of the corresponding DL transmission is at most 584 us. |

According to one embodiment of the present disclosure, a one-to-one correspondence relationship between two resource pools may be defined. For example, herein, it is assumed that a control channel (PSCCH) linked to a reference signal (e.g., SL PRS) is transmitted in a first resource pool, and the reference signal is transmitted in a second resource pool.

For example, in the first resource pool, a control channel may be transmitted one per shared channel (e.g., SCH, or PSSCH).

For example, a PSCCH index transmitted by the shared channel may have a one-to-one correspondence relationship with a reference signal resource index (or, ID) transmitted in the second resource pool.

- For example, here, the control channel index may match the reference signal resource index. In this case, when the control channel linked to a reference signal and a control channel for SL communication (e.g., PSCCH) are transmitted as being FDMed in a first resource pool, in order to match the control channel index and a reference signal index, the control channel index linked to the reference signal may only have a value in the range of 0 to #reference signal resource-1.
- For example, a control channel index may be mapped to the reference signal resource index by an arbitrary one-to-one function f. In this case, for example, when a control channel linked to a reference signal and a control channel for SL communication are transmitted as being FDMed in a first resource pool, in order to match the control channel index with the reference signal index, the control channel indexes of a consecutive number of #reference signal resources may be mapped one-to-one to the reference signal resource. For example, the control channel index linked to the reference signal may only have a value in the range 0 to #reference signal resource-1.
- Alternatively, for example, if a control channel linked to the reference signal and the control channel for SL communication are transmitted as being FDMed in the first resource pool, in order to match the control channel index with the reference signal index, a hypothetical control channel index comprising only the control channel linked to the reference signal may be assumed, and the hypothetical control channel index may be matched with the reference signal resource index.

On the other hand, if the resource pool from which a reference signal (e.g., SL PRS) for a positioning (e.g., SL positioning) is transmitted and the resource pool from which a channel/signal linked to the reference signal is transmitted are different, a method for selecting a resource for a transmission of the reference signal and linked channel/signal based on inter-UE coordination (IUC) messages needs to be defined.

In the present disclosure, a method and operation for selecting a candidate resource for transmission of the reference signal and a transmission resource for a transmission of a channel/signal linked to the reference signal based on an inter-UE coordination (IUC) message under the conditions described above, and a device supporting the same are proposed.

For example, for (or, for each of) at least one among elements/parameters of service type (and/or (LCH or service) priority and/or QoS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re) transmission from a transmitting UE, etc.), whether the rule is applied (and/or the proposed method/rule-related parameter value of the present disclosure) may be specifically (or differently or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE) PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, the term "specific threshold" below may refer to a threshold value defined in advance or (pre-) configured by a higher layer (including an application layer) of a network, a base station, or a UE. Hereinafter, the term "specific configuration value" may refer to a value defined in advance or (pre-) configured by a higher layer (including an application layer) of a network, a base station, or a UE. Hereinafter, "configured by a network/base station" may mean an operation in which a base station configures (in advance) a UE by higher layer RRC signaling, configures/signals a UE through MAC CE, or signals a UE through DCI.

In the following disclosure, the following terms are used.

LMF-location management function

UE-triggered SL positioning—sidelink (SL) positioning where the procedure is triggered by UE gNB/LMF-triggered SL positioning—SL positioning where the procedure is triggered by gNB/LMF UE-controlled SL positioning—SL positioning where the SL positioning group is created by UE gNB-controlled SL positioning—SL positioning where the SL positioning group is created by gNB UE-based SL positioning—SL positioning where the UE position is calculated by UE UE-assisted SL positioning—SL positioning where the UE position is calculated by gNB/LMF SL positioning group-UEs that participates in SL positioning Target UE (T-UE)—UE whose position is calculated Server UE (S-UE)—UE that assists T-UE's positioning Anchor UE—UE that assists T-UE's positioning MG—measurement gap where only SL PRS transmission is allowed MW—measurement window where both SL data and SL PRS can be transmitted in a multiplexed way SL PRS—sidelink positioning reference signal CCH—control channel IUC message—inter-UE coordination message. It is a message that a transmitting UE receives from another UE, including a receiving UE, and it may mean a message that includes information for a preferred resource set that is suitable for a transmitting UE to transmit to a receiving UE and/or a non-preferred resource set that is not suitable for the transmitting UE to transmit.

According to an embodiment of the present disclosure, an SL PRS transmission resource may be composed of an SL PRS resource set composed of the following information. Or, for example, information related to SL PRS transmission resources may include some or all of the following information.

1. SL PRS resource set ID
2. SL PRS resource ID list: an SL PRS resource ID list in an SL PRS resource set
3. SL PRS resource type: it can be configured as periodic, aperiodic, semi-persistent, or on-demand.
4. Alpha value for SL PRS power control
5. PO value for SL PRS power control
6. Pathloss reference for SL PRS power control: it can be configured as SL synchronization signal block (SSB), downlink (DL) PRS, uplink (UL) sounding reference signal (SRS), SL SRS for positioning, PSCCH DMRS, PSSCH DMRS, PSFCH, or SL CSI RS etc.

According to an embodiment of the present disclosure, an SL PRS resource set may be composed of an SL PRS resource composed of the following information. Or, for example, information related to the SL PRS transmission resource may include some or all of the following information.

1. SL PRS resource ID
2. SL PRS comb size: an interval between REs at which an SL PRS is transmitted within a symbol.
3. SL PRS comb offset: an index of a RE at which an SL PRS is initially transmitted within the first SL PRS symbol.
4. SL PRS comb cyclic shift: cyclic shift used to generate the sequence constituting the SL PRS.
5. SL PRS start position: an index of the first symbol in which SL PRS is transmitted within one slot.
6. SL PRS #symbol: the number of symbols constituting SL PRS within one slot
7. Frequency domain shift: position (of an index) of the lowest frequency at which SL PRS is transmitted in the frequency domain
8. SL PRS BW: Frequency Bandwidth Used for SL PRS Transmission
9. SL PRS resource type: it can be configured as periodic, aperiodic, semi-persistent, or on-demand.
10. SL PRS periodicity: it is a period in the time domain between SL PRS resources, and has a physical or logical slot unit of a resource pool in which the SL PRS is transmitted.
11. SL PRS offset: Reference timing Reference, an offset in the time domain to the start of the first SL PRS resource, and it has units of physical or logical slots of resource pools in which SL PRSs are transmitted. For example, the reference timing may be SFN=0, DFN=0, or a successful reception or decoding time of RRC/MAC CE/DCI/SCI related to the SL PRS resource.
12. SL PRS sequence ID
13. SL PRS spatial relation: It can be configured to SL SSB, DL PRS, UL SRS, UL SRS for positioning, PSCCH DMRS, PSSCH DMRS, PSFCH, or SL CSI RS.
14. SL PRS CCH: SL PRS control channel. For example, SL PRS resource configuration information and resource location may be signaled through the SL PRS CCH.

For example, in the following description, an SL PRS may be substituted/replaced with a reference signal.

According to one embodiment of the present disclosure, when a positioning (e.g., SL positioning) is performed, a reference signal (e.g., SL PRS) may be transmitted on resource pool B (e.g., a dedicated resource pool for transmission of a reference signal only), and channels/signals linked to the reference signal may be transmitted on resource pool A (e.g., a common resource pool for transmissions of SL communication channels/signals, positioning triggering/control information linked to the reference signal, control information (e.g., SCI), measurement results, location information, and the like).

Here, for example, based on an inter-UE coordination (IUC) message transmitted by a coordinating UE-A to a coordinated UE-B, the UE-B may select a transmission resource for the transmission of a reference signal (e.g., SL PRS) and the linked control channel by the following means.

For example, the UE-A may determine, in resource pool A, preferred/non-preferred resources and/or resources with detected/expected conflicts for transmission of IUC messages for transmission resources for transmission of control information (e.g., SCI) of the UE-B.

For example, the UE-A may determine, from resource pool B, a preferred/non-preferred resource and/or a resource with detected/expected conflicts for transmission of an IUC message for a transmission resource for transmitting a reference signal (e.g., SL PRS) of the UE-B.

For example, a one-to-one correspondence relationship may be (pre-) configured or defined between the position of the time/frequency domain of a resource for transmitting control information (hereinafter, it may be extended to the resources of PSCCH/PSSCH transmitting control information) in resource pool A and the position of the time/frequency domain of a resource for transmitting a reference signal in resource pool B.

In this case, for example, the UE-A may only transmit an IUC message for the transmission of control information in resource pool A without separately transmitting an IUC message for the transmission of a reference signal in resource pool B.

Thereafter, for example, the UE-B may select SCI resource A in the resource pool A and (automatically) select resource B in the resource pool B based on the one-to-one correspondence relationship, considering the IUC message for transmission of control information in resource pool A received from the UE-A and the sensing result of the UE-B.

Alternatively, for example, when the UE-A receives transmission resource reservation information where it has to receive control information (e.g., SCI) from another UE in resource pool A, the UE-A may include transmission resource information of a reference signal (e.g., SL PRS) in resource pool B linked to the resource reservation information of the control information based on the above one-to-one correspondence relationship, into a non-preferred resource (set) information in the IUC messages to be transmitted to the UE-B.

And/or, for example, when the UE-A receives transmission resource reservation information where it has to receive a reference signal from another UE in resource pool B, it may include transmission resource information of control information in resource pool A linked to the resource reservation information of the reference signal into the non-preferred resource (set) information in the IUC message to be transmitted to the UE-B based on the above one-to-one correspondence relationship.

Figure 15:
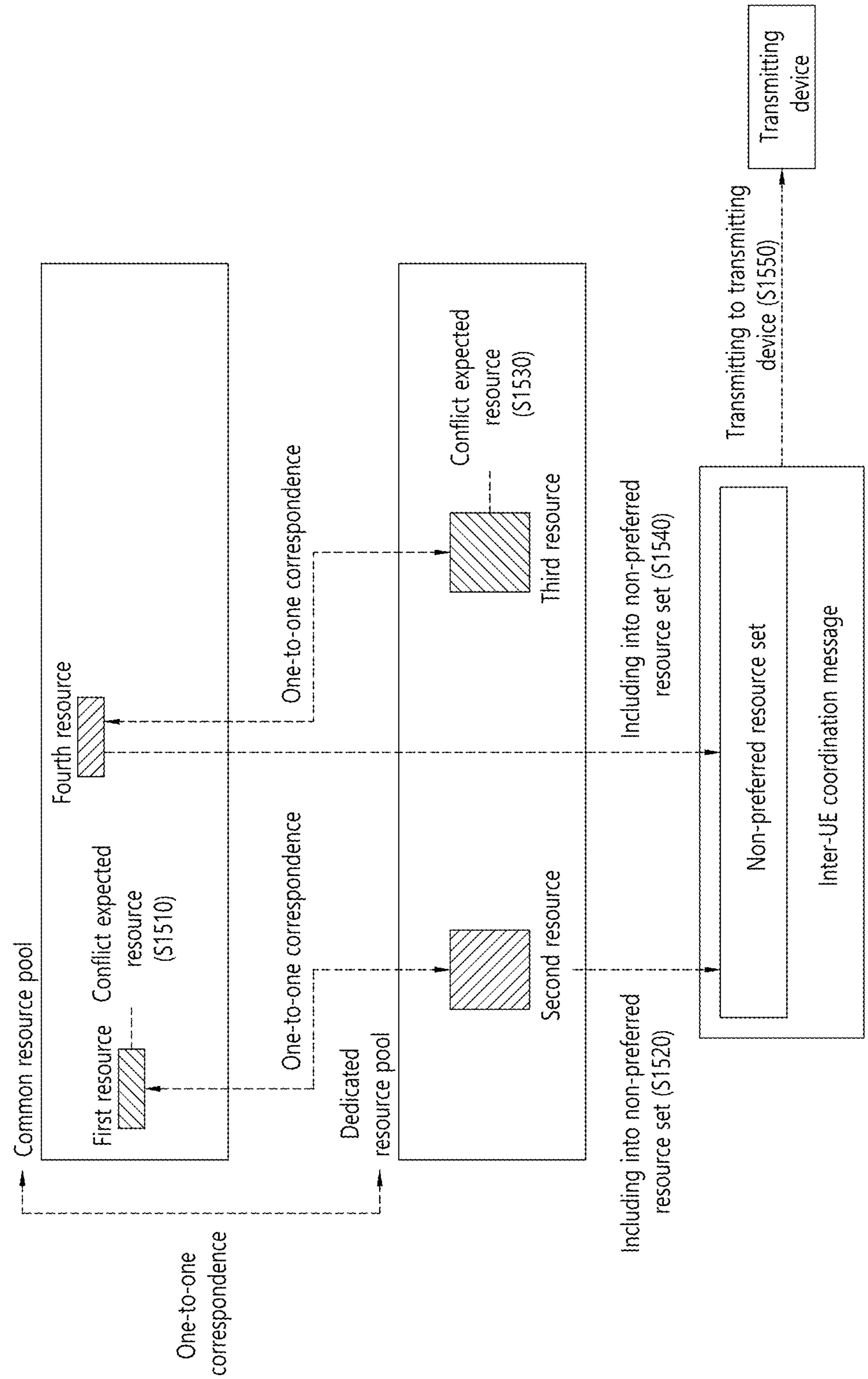
FIG. 15 shows a procedure for reporting a non-preferred resource set determined based on sensing performed within a dedicated resource pool and a public resource pool, which have a one-to-one correspondence relationship, respectively, according to one embodiment of the present disclosure.

FIG. 15 shows a procedure for reporting a non-preferred resource set determined based on sensing performed within a dedicated resource pool and a public resource pool, which have a one-to-one correspondence relationship, respectively, according to one embodiment of the present disclosure. The embodiment of FIG. 15 may be combined with various embodiments of the present disclosure.

Referring to FIG. 15, a common resource pool and a dedicated resource pool are shown. For example, a common resource pool may mean a resource pool in which transmission of control channel for transmission of a reference signal (e.g., SL PRS), transmission of a reference signal, and transmission of data (e.g., PSCCH, PSSCH, etc.) are enabled therein. For example, a dedicated resource pool may mean a resource pool in which only the transmission of a reference signal is enabled therein. For example, since a large bandwidth may be required for transmission of a reference signal, large bandwidth may be allowed for transmission resources in a dedicated resource pool compared to transmission resources in a common resource pool.

For example, in this embodiment, it is assumed that the common resource pool and the dedicated resource pool have a one-to-one correspondence relationship. Due to the one-to-one correspondence relationship, a first resource in the common resource pool has a one-to-one correspondence relationship with a second resource in the dedicated resource pool. Further, due to the one-to-one correspondence relationship, a third resource in the dedicated resource pool has a one-to-one correspondence relationship with a fourth resource in the public resource pool.

For example, according to various embodiments of the present disclosure, a receiving device may include a specific resource in a different resource pool that corresponds to the resource in which a conflict is expected into a non-preferred resource set to be reported to a transmitting device via an inter-UE coordination message.

In step S1510, a receiving device (of a reference signal) transmitting an inter-UE coordination message may perform sensing within the common resource pool and, as a result, determine a resource (first resource) in which a conflict is expected. For example, since the resource in the dedicated resource pool corresponding to the first resource is the second resource, in step S1520 the receiving device may include the second resource into the non-preferred resource set.

In step S1530, the receiving device may determine a resource (third resource) in the dedicated resource pool in which a conflict is expected. Here, the expectation of conflict may be determined via various methods. For example, the various methods may include sensing related to listen before talk (LBT), sensing for control information, estimation performed based on pre-configured information, and the like. For example, since the resource in the common resource pool corresponding to the third resource is the fourth resource, in step S1540, the receiving device may include the fourth resource into the non-preferred resource set.

In step S1550, the receiving device may report (transmit) information for the non-preferred resource set that is finally determined through the procedure to a transmitting device via an inter-UE coordination message. For example, the inter-UE coordination message may be transmitted via the common resource pool. For example, the inter-UE coordination message may be transmitted via the common resource pool, based on that only a transmission of reference signals is enabled in the dedicated resource pool.

According to one embodiment of the present disclosure, a UE-B (e.g., the coordinated UE) may select a transmission resource A for transmitting control information (e.g., SCI) in the resource pool A and a resource B for transmitting a reference signal (e.g., SL PRS) in the resource pool B based on information for preferred/non-preferred resource sets for the resource pool A and resource pool B received from a UE-A (e.g., the coordinating UE) and sensing results of the UE-B.

In this case, for example, based on the information for the non-preferred resource set for the resource pool A and/or resource pool B and the one-to-one correspondence relationship, the UE-B may exclude (from a candidate resource set) a candidate transmission resource A for transmission of control information in the resource pool A and/or a candidate transmission resource B for transmission of a reference signal in the resource pool B.

For example, for each of the resource pool A and resource pool B, the UE-B may preferentially select a candidate transmission resource A for transmitting control information in the resource pool A and a candidate transmission resource B for transmitting a reference signal in the resource pool B from the intersection of each preferred resource set and the sensing results of the UE-B.

For example, in the case described above, the UE-B may select, from each of the candidate resource sets (candidate resource set A in resource pool A and candidate resource set B in resource pool B), a resource A and a resource B such that the time interval between the resource A and the resource B is greater than or equal to a minimum threshold and/or less than or equal to a maximum threshold, as the final transmission resource.

According to various embodiments of the present disclosure, an efficient method for selecting a transmission resource for transmission of a reference signal for positioning and a channel/signal linked to the reference signal based on an inter-UE coordination (IUC) message is proposed, wherein the resource pool over which the reference signal is transmitted and the resource pool over which the channel/signal linked to the reference signal is transmitted are different.

For example, methods for positioning a UE may include GNSS, OTDOA, enhanced cell ID (E-CID), barometric sensor positioning, WLAN positioning, Bluetooth positioning, and terrestrial beacon system (TBS), UTDOA (Uplink Time Difference of Arrival), and the like. In the TDOA method, the location of a UE may be estimated by measuring the distance of the transmitting and receiving ends based on the measured RSTD, determining a geometric hyperbola based on the distance, and estimating the point where the determined hyperbola intersects as the location of the UE. The reference signal transmitted or received for positioning may include an SL PRS. For example, a UE may select a resource for transmitting a reference signal. Here, a method for selecting a resource for transmitting a reference signal within an IUC-based dedicated resource pool may need to be defined.

According to various embodiments of the present disclosure, a first resource pool over which a control channel for transmitting a reference signal is transmitted and received and a second resource pool over which the reference signal is transmitted and received may be configured separately. In this case, for example, in a first resource pool, a first resource for transmitting an IUC may be selected and a second resource in a second resource pool, in a one-to-one correspondence relationship with the first resource, may be selected as a resource for transmitting the reference signal.

Alternatively, for example, a conflict resource determined based on the sensing performed to select a resource for transmitting control information in the first resource pool may be included into a non-preferred resource set that may be applied to the resource selection in the second resource pool. Or, for example, a conflict resource determined based on sensing performed to select a transmission resource for a reference signal in the second resource pool may be included into a non-preferred resource set that may be applied in the first resource pool. For example, a non-preferred resource set may be transmitted over the first resource pool via a control signal by being included in an IUC message.

For example, in accordance with various embodiments of the present disclosure, the effect of separating resource pools in positioning may be achieved while avoiding wasting resources by enabling only one signal to be transmitted with non-preferred resource set information that takes into account expected resource conflicts related to both resource pools when the common and dedicated resource pools are separated.

For example, when the common resource pool and the dedicated resource pool are separated, a reference signal (e.g., SL PRS) is transmitted in the dedicated resource pool, and since a reference signal requires a large BW, the positioning performance may be better when transmitted in the dedicated resource pool than when transmitted in the common resource pool. In addition, for example, if there is a one-to-one correspondence relationship between the common resource pool and the dedicated resource pool, the signaling overhead may be reduced since non-preferred resource set information for multiple resource pools may be delivered via only one indication that includes information on all expected collisions in each resource pool.

Figure 16:
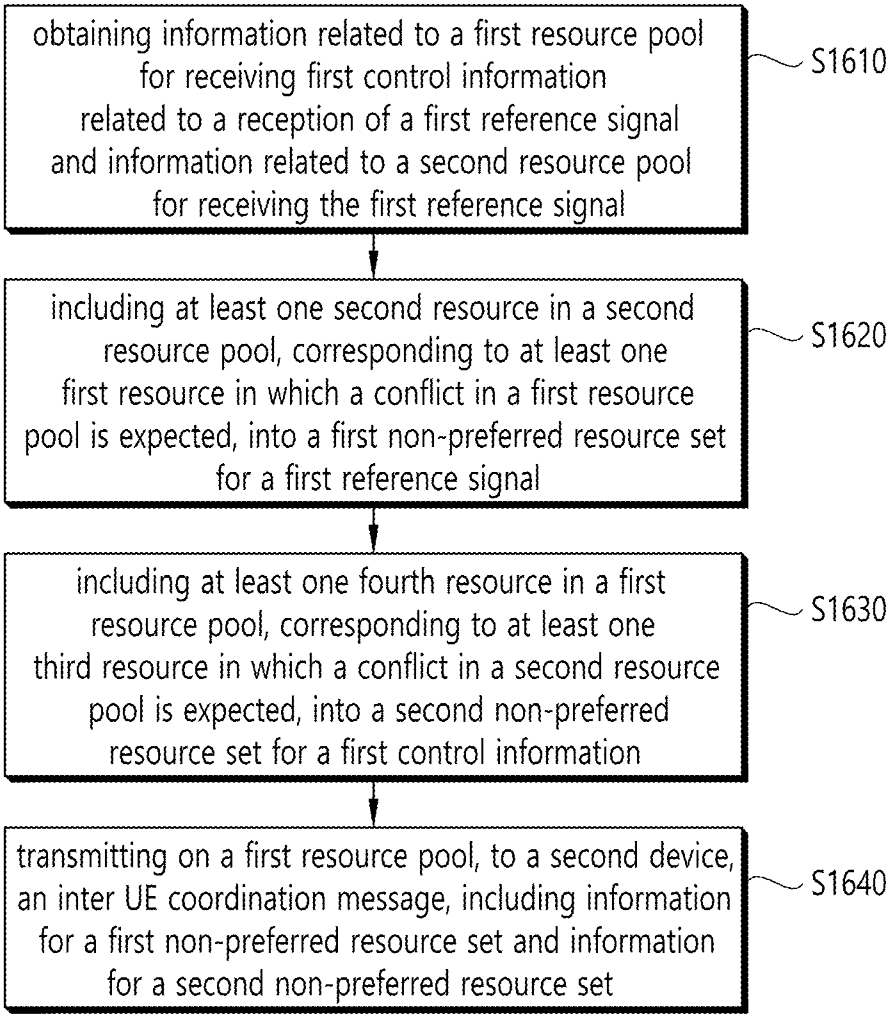
FIG. 16 shows a procedure for a first device to perform wireless communication, according to one embodiment of the present disclosure.

FIG. 16 shows a procedure for a first device to perform wireless communication, according to one embodiment of the present disclosure. The embodiment of FIG. 16 may be combined with various embodiments of the present disclosure.

Referring to FIG. 16, in step S1610, a first device may obtain information related to a first resource pool for receiving first control information related to a reception of a first reference signal and information related to a second resource pool for receiving the first reference signal. For example, the first resource pool and the second resource pool may have a one-to-one correspondence relationship. In step S1620, the first device may include at least one second resource in the second resource pool, corresponding to at least one first resource in which a conflict in the first resource pool is expected, into a first non-preferred resource set for the first reference signal. In step S1630, the first device may include at least one fourth resource in the first resource pool, corresponding to at least one third resource in which a conflict in the second resource pool is expected, into a second non-preferred resource set for the first control information. In step S1640, the first device may transmit on the first resource pool, to a second device, an inter user equipment (UE) coordination message, including information for the first non-preferred resource set and information for the second non-preferred resource set.

For example, a resource in the first resource pool and a resource in the second resource pool may have a one-to-one correspondence relationship.

For example, the conflict in the first resource pool may be expected based on first sensing which is performed for the first resource pool, and the conflict in the second resource pool may be expected based on second sensing which is performed for the second resource pool.

For example, the inter UE coordination message may be transmitted as being included in second control information.

For example, a resource selection procedure of the second device may be performed based on the information for the first non-preferred resource set and the information for the second non-preferred resource set.

For example, a first resource in the first resource pool and a second resource in the second resource pool may be selected in the resource selection procedure, and an interval between a time point of the first resource and a time point of the second resource may be greater than or equal to a minimum threshold value and less than or equal to a maximum threshold value.

For example, a first resource in the first resource pool may be selected in the resource selection procedure, and a second resource in the second resource pool may be selected based on the selected first resource and the one-to-one correspondence relationship.

For example, additionally, the first device may receive, from the second device, the first control information, based on a first resource in the first resource pool; and receive the first reference signal, based on a second resource in the second resource pool. For example, the first resource and the second resource are selected in the resource selection procedure.

For example, additionally, the first device may select a third resource in the first resource pool and a fourth resource in the second resource pool; transmit, to the second device, second control information related to a transmission of a second reference signal, based on the third resource; and transmit, to the second device, the second reference signal, based on the fourth resource. For example, a positioning for the second device may be performed based on based on the first reference signal and the second reference signal.

For example, a transmission of a reference signal and a transmission of control information related to a transmission of a reference signal may be enabled in the first resource pool.

For example, only a transmission of a reference signal may be enabled in the second resource pool.

For example, the inter UE coordination message may include information for a preferred resource set.

For example, the first reference signal may be a reference signal for a positioning.

The embodiments described above may be applied to various devices described below. For example, a processor 102 of a first device 100 may obtain information related to a first resource pool for receiving first control information related to a reception of a first reference signal and information related to a second resource pool for receiving the first reference signal. For example, the first resource pool and the second resource pool may have a one-to-one correspondence relationship. And, the processor 102 of the first device 100 may include at least one second resource in the second resource pool, corresponding to at least one first resource in which a conflict in the first resource pool is expected, into a first non-preferred resource set for the first reference signal. And, the processor 102 of the first device 100 may include at least one fourth resource in the first resource pool, corresponding to at least one third resource in which a conflict in the second resource pool is expected, into a second non-preferred resource set for the first control information. And, the processor 102 of the first device 100 may control a transceiver 106 to transmit on the first resource pool, to a second device 200, an inter user equipment (UE) coordination message, including information for the first non-preferred resource set and information for the second non-preferred resource set.

According to an embodiment of the present disclosure, a first device for performing wireless communication may be proposed. For example, the first device may comprise: at least one transceiver; at least one processor; and at least one memory operably connectable to the at least one processor and storing instructions. For example, the instructions, based on being executed by the at least one processor, may cause the first device to perform operations, wherein the operations may comprise: obtaining information related to a first resource pool for receiving first control information related to a reception of a first reference signal and information related to a second resource pool for receiving the first reference signal, wherein the first resource pool and the second resource pool may have a one-to-one correspondence relationship; including at least one second resource in the second resource pool, corresponding to at least one first resource in which a conflict in the first resource pool is expected, into a first non-preferred resource set for the first reference signal; including at least one fourth resource in the first resource pool, corresponding to at least one third resource in which a conflict in the second resource pool is expected, into a second non-preferred resource set for the first control information; and transmitting on the first resource pool, to a second device, an inter user equipment (UE) coordination message, including information for the first non-preferred resource set and information for the second non-preferred resource set.

For example, a resource in the first resource pool and a resource in the second resource pool may have a one-to-one correspondence relationship.

For example, the conflict in the first resource pool may be expected based on first sensing which is performed for the first resource pool, and the conflict in the second resource pool may be expected based on second sensing which is performed for the second resource pool.

For example, the inter UE coordination message may be transmitted as being included in second control information.

For example, a resource selection procedure of the second device may be performed based on the information for the first non-preferred resource set and the information for the second non-preferred resource set.

For example, a first resource in the first resource pool and a second resource in the second resource pool may be selected in the resource selection procedure, and an interval between a time point of the first resource and a time point of the second resource may be greater than or equal to a minimum threshold value and less than or equal to a maximum threshold value.

For example, a first resource in the first resource pool may be selected in the resource selection procedure, and a second resource in the second resource pool may be selected based on the selected first resource and the one-to-one correspondence relationship.

For example, additionally, the operations may further comprise: receiving, from the second device, the first control information, based on a first resource in the first resource pool; and receiving the first reference signal, based on a second resource in the second resource pool. For example, the first resource and the second resource are selected in the resource selection procedure.

For example, additionally, the operations may further comprise: selecting a third resource in the first resource pool and a fourth resource in the second resource pool; transmitting, to the second device, second control information related to a transmission of a second reference signal, based on the third resource; and transmitting, to the second device, the second reference signal, based on the fourth resource. For example, a positioning for the second device may be performed based on based on the first reference signal and the second reference signal.

For example, a transmission of a reference signal and a transmission of control information related to a transmission of a reference signal may be enabled in the first resource pool.

For example, only a transmission of a reference signal may be enabled in the second resource pool.

For example, the inter UE coordination message may include information for a preferred resource set.

For example, the first reference signal may be a reference signal for a positioning.

According to an embodiment of the present disclosure, a device adapted to control a first user equipment (UE) may be proposed. For example, the device may comprise: at least one processor; and at least one memory operably connectable to the at least one processor and storing instructions. For example, the instructions, based on being executed by the at least one processor, may cause the first UE to perform operations, wherein the operations may comprise: obtaining information related to a first resource pool for receiving first control information related to a reception of a first reference signal and information related to a second resource pool for receiving the first reference signal, wherein the first resource pool and the second resource pool may have a one-to-one correspondence relationship; including at least one second resource in the second resource pool, corresponding to at least one first resource in which a conflict in the first resource pool is expected, into a first non-preferred resource set for the first reference signal; including at least one fourth resource in the first resource pool, corresponding to at least one third resource in which a conflict in the second resource pool is expected, into a second non-preferred resource set for the first control information; and transmitting on the first resource pool, to a second UE, an inter UE coordination message, including information for the first non-preferred resource set and information for the second non-preferred resource set.

According to an embodiment of the present disclosure, a non-transitory computer-readable storage medium storing instructions may be proposed. For example, the instructions based on being executed, may cause a first device to: obtain information related to a first resource pool for receiving first control information related to a reception of a first reference signal and information related to a second resource pool for receiving the first reference signal, wherein the first resource pool and the second resource pool may have a one-to-one correspondence relationship; include at least one second resource in the second resource pool, corresponding to at least one first resource in which a conflict in the first resource pool is expected, into a first non-preferred resource set for the first reference signal; include at least one fourth resource in the first resource pool, corresponding to at least one third resource in which a conflict in the second resource pool is expected, into a second non-preferred resource set for the first control information; and transmit on the first resource pool, to a second device, an inter user equipment (UE) coordination message, including information for the first non-preferred resource set and information for the second non-preferred resource set.

Figure 17:
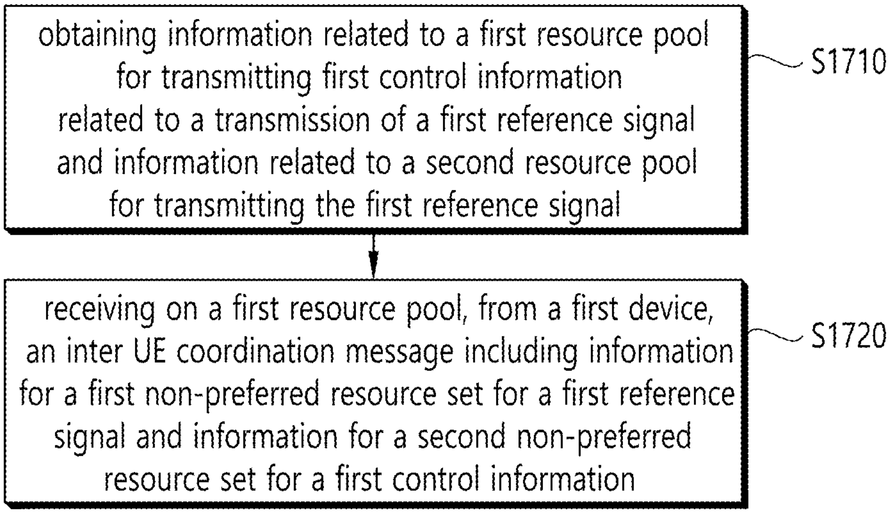
FIG. 17 shows a procedure for a second device to perform wireless communication, according to one embodiment of the present disclosure.

FIG. 17 shows a procedure for a second device to perform wireless communication, according to one embodiment of the present disclosure. The embodiment of FIG. 17 may be combined with various embodiments of the present disclosure.

Referring to FIG. 17, in step S1710, a second device may obtain information related to a first resource pool for transmitting first control information related to a transmission of a first reference signal and information related to a second resource pool for transmitting the first reference signal. For example, the first resource pool and the second resource pool may have a one-to-one correspondence relationship. In step S1720, the second device may receive on the first resource pool, from a first device, an inter user equipment (UE) coordination message including information for a first non-preferred resource set for the first reference signal and information for a second non-preferred resource set for the first control information. For example, the first non-preferred resource set may include at least one second resource in the second resource set, corresponding to at least one first resource in which a conflict in the first resource pool is expected by the first device, and the second non-preferred resource set may include at least one fourth resource in the first resource set, corresponding to at least one third resource in which a conflict in the second resource pool is expected by the first device.

For example, additionally, the second device may select a first resource in the first resource pool based on information for the second non-preferred resource set; select a second resource in the second resource pool based on information for the first non-preferred resource set; transmit, to the first device, the first control information based on the first resource; and transmit, to the second device, the first reference signal, based on the second resource.

The embodiments described above may be applied to various devices described below. For example, a processor 202 of a second device 200 may obtain information related to a first resource pool for transmitting first control information related to a transmission of a first reference signal and information related to a second resource pool for transmitting the first reference signal. For example, the first resource pool and the second resource pool may have a one-to-one correspondence relationship. And, the processor 202 of the second device 200 may control a transceiver 206 to receive on the first resource pool, from a first device 100, an inter user equipment (UE) coordination message including information for a first non-preferred resource set for the first reference signal and information for a second non-preferred resource set for the first control information. For example, the first non-preferred resource set may include at least one second resource in the second resource set, corresponding to at least one first resource in which a conflict in the first resource pool is expected by the first device 100, and the second non-preferred resource set may include at least one fourth resource in the first resource set, corresponding to at least one third resource in which a conflict in the second resource pool is expected by the first device 100.

According to an embodiment of the present disclosure, a second device for performing wireless communication may be proposed. For example, the second device may comprise: at least one transceiver; at least one processor; and at least one memory operably connectable to the at least one processor and storing instructions. For example, the instructions, based on being executed by the at least one processor, may cause the second device to perform operations, wherein the operations may comprise: obtaining information related to a first resource pool for transmitting first control information related to a transmission of a first reference signal and information related to a second resource pool for transmitting the first reference signal, wherein the first resource pool and the second resource pool may have a one-to-one correspondence relationship; and receiving on the first resource pool, from a first device, an inter user equipment (UE) coordination message including information for a first non-preferred resource set for the first reference signal and information for a second non-preferred resource set for the first control information, wherein the first non-preferred resource set may include at least one second resource in the second resource set, corresponding to at least one first resource in which a conflict in the first resource pool is expected by the first device, and wherein the second non-preferred resource set may include at least one fourth resource in the first resource set, corresponding to at least one third resource in which a conflict in the second resource pool is expected by the first device.

For example, the operations may further comprise: selecting a first resource in the first resource pool based on information for the second non-preferred resource set; selecting a second resource in the second resource pool based on information for the first non-preferred resource set; transmitting, to the first device, the first control information based on the first resource; and transmitting, to the second device, the first reference signal, based on the second resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
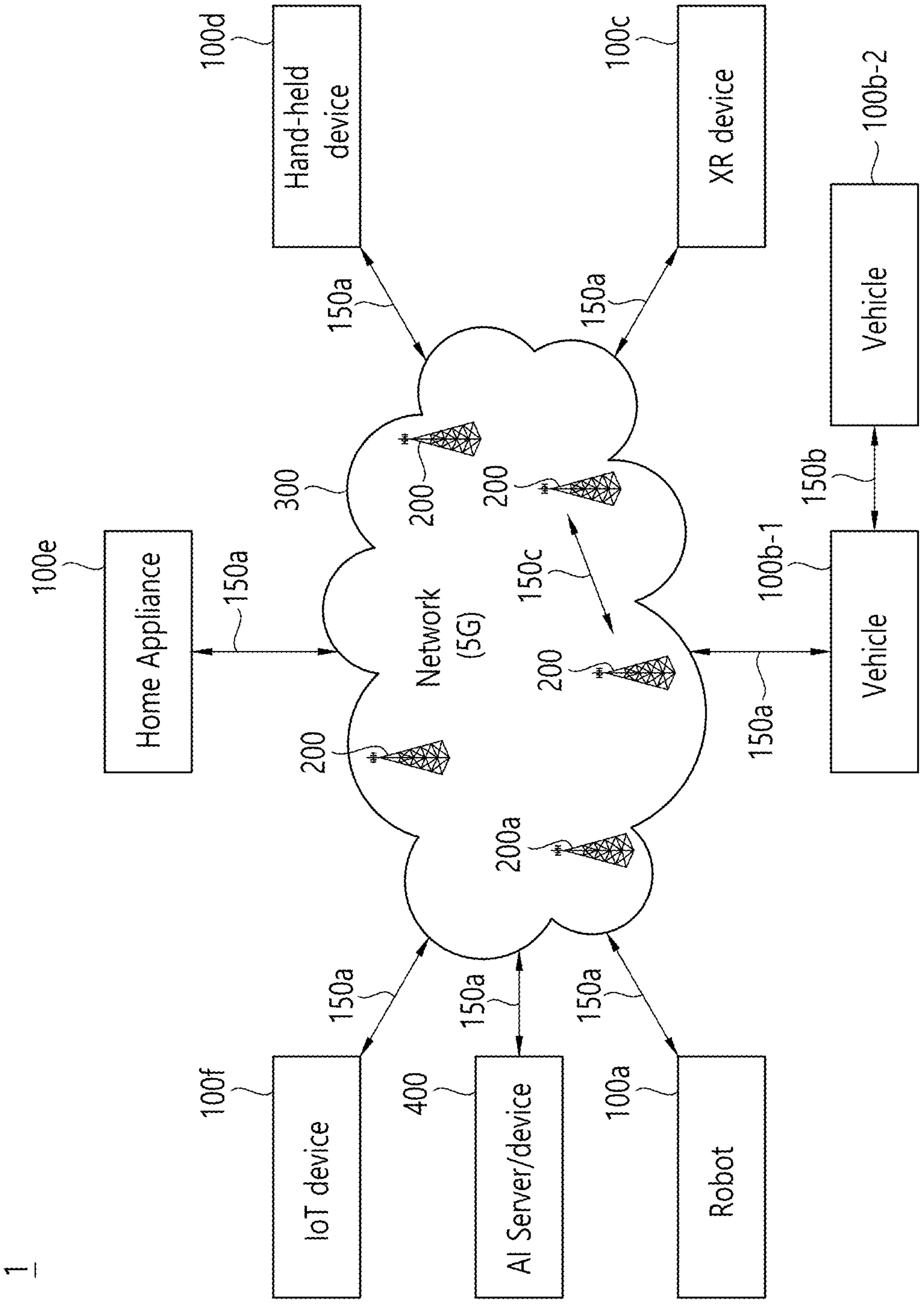
FIG. 18 shows a communication system 1, based on an embodiment of the present disclosure.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
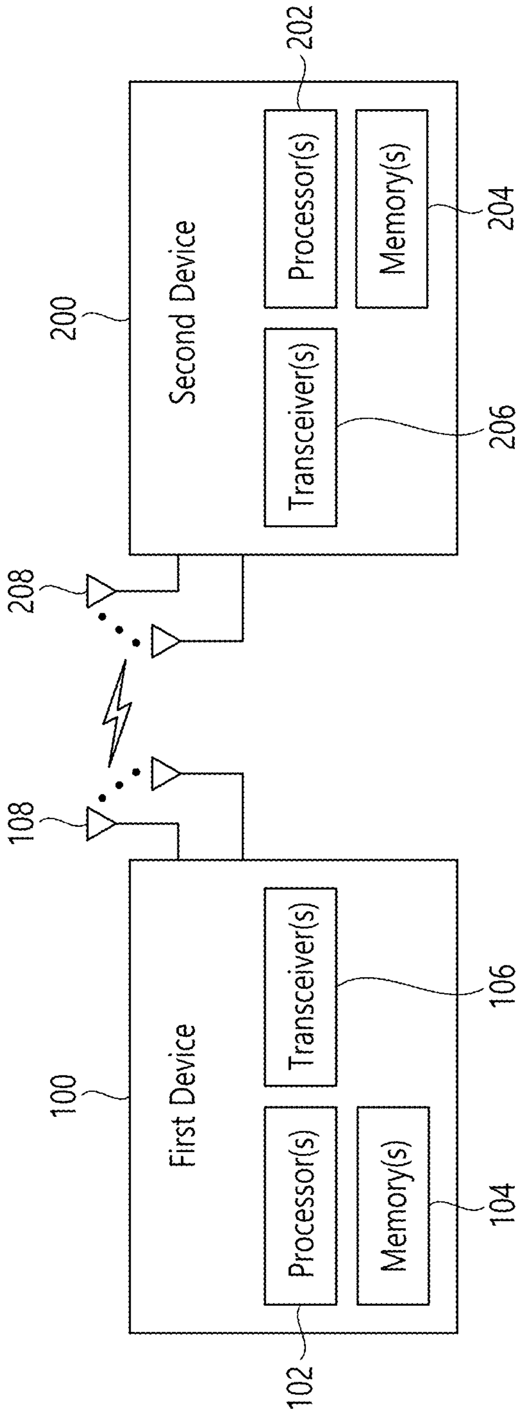
FIG. 19 shows wireless devices, based on an embodiment of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
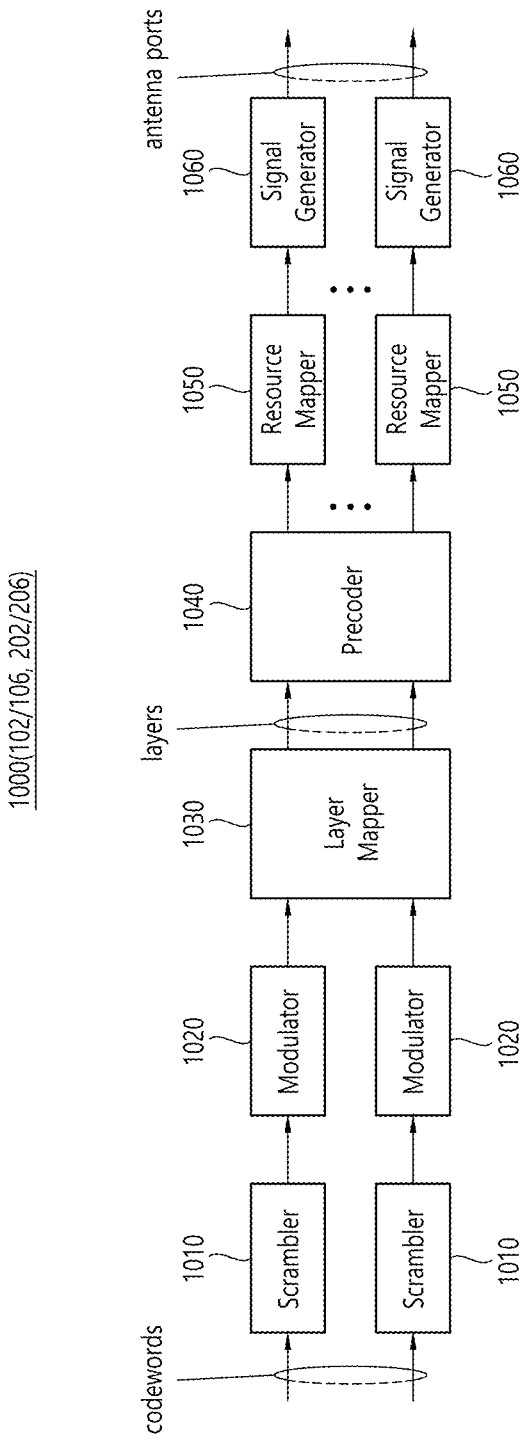
FIG. 20 shows a signal process circuit for a transmission signal, based on an embodiment of the present disclosure.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
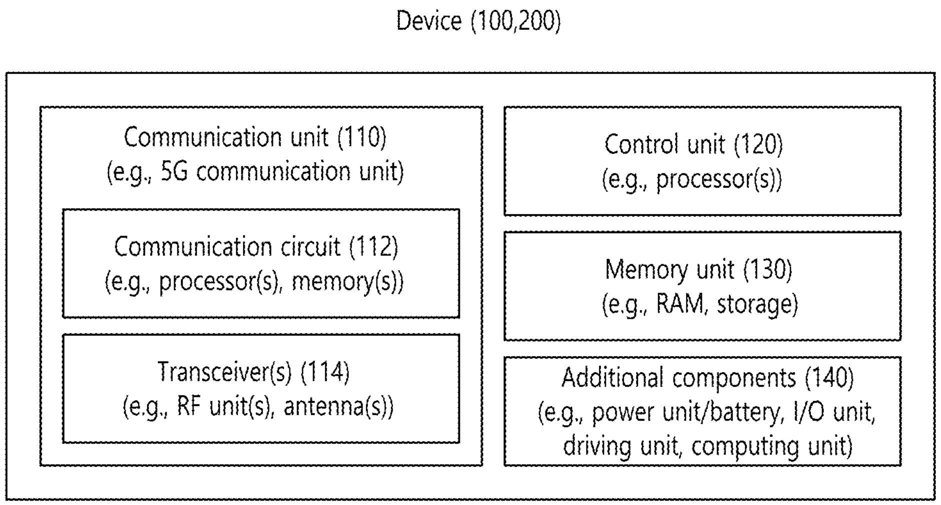
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
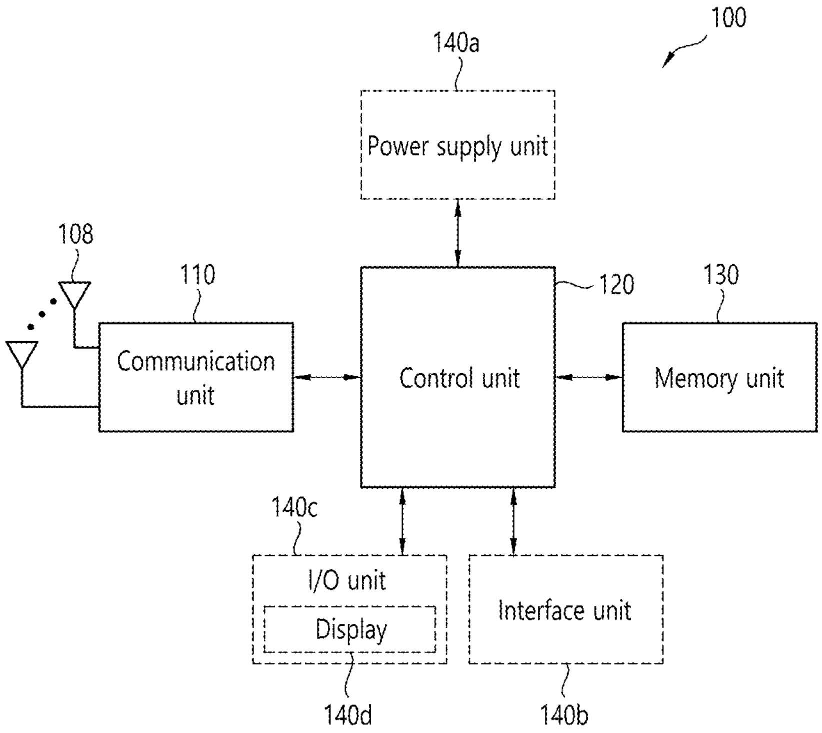
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 23:
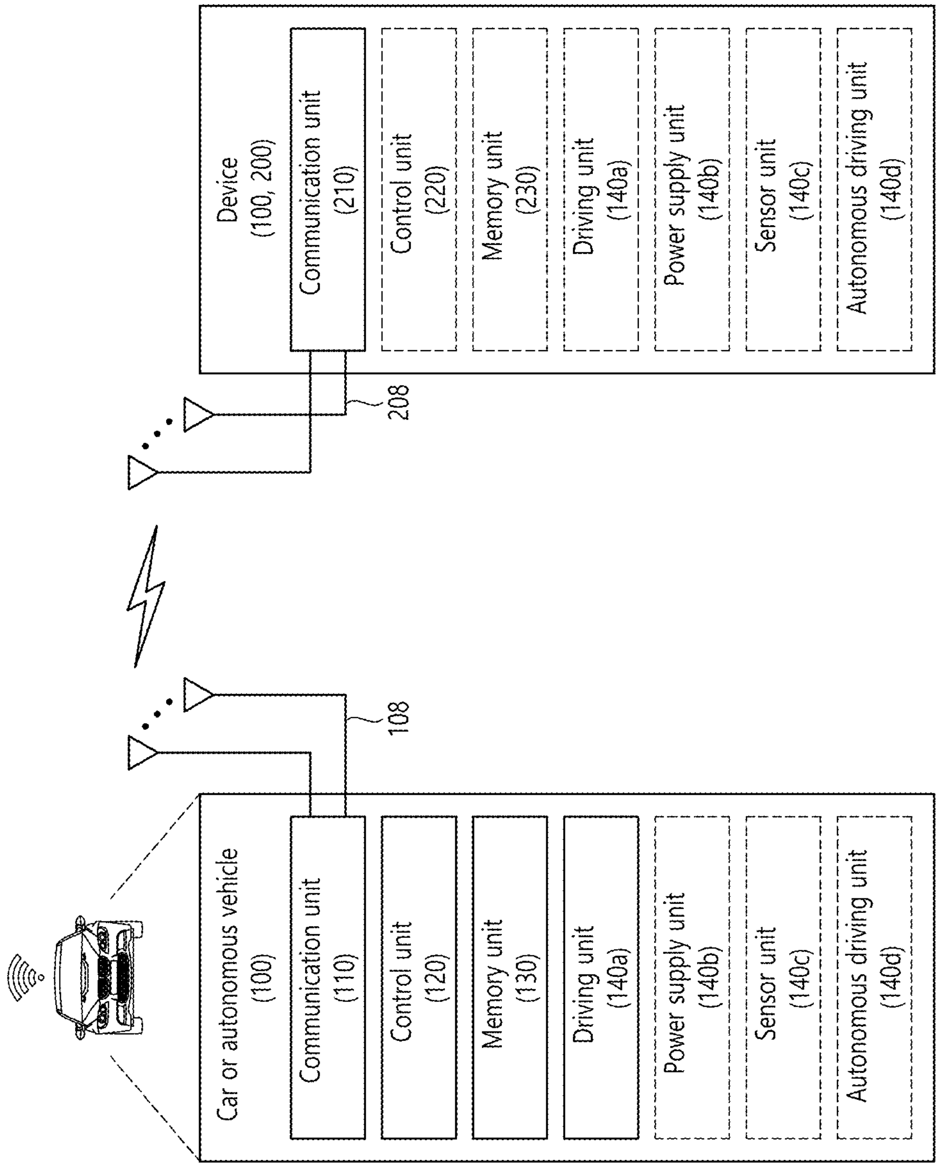
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a conflict sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining information related to a first resource pool for receiving first control information related to a reception of a first reference signal and information related to a second resource pool for receiving the first reference signal, wherein the first resource pool and the second resource pool have a one-to-one correspondence relationship;

including at least one second resource in the second resource pool, corresponding to at least one first resource in which a conflict in the first resource pool is expected, into a first non-preferred resource set for the first reference signal;

including at least one fourth resource in the first resource pool, corresponding to at least one third resource in which a conflict in the second resource pool is expected, into a second non-preferred resource set for the first control information; and transmitting on the first resource pool, to a second device, an inter user equipment (UE) coordination message, including information for the first non-preferred resource set and information for the second non-preferred resource set.

2. The method of claim 1, wherein a resource in the first resource pool and a resource in the second resource pool have a one-to-one correspondence relationship.

3. The method of claim 1, wherein the conflict in the first resource pool is expected based on first sensing which is performed for the first resource pool, and wherein the conflict in the second resource pool is expected based on second sensing which is performed for the second resource pool.

4. The method of claim 1, wherein the inter UE coordination message is transmitted as being included in second control information.

5. The method of claim 1, wherein a resource selection procedure of the second device is performed based on the information for the first non-preferred resource set and the information for the second non-preferred resource set.

6. The method of claim 5, wherein a first resource in the first resource pool and a second resource in the second resource pool are selected in the resource selection procedure, and wherein an interval between a time point of the first resource and a time point of the second resource is greater than or equal to a minimum threshold value and less than or equal to a maximum threshold value.

7. The method of claim 5, wherein a first resource in the first resource pool is selected in the resource selection procedure, and wherein a second resource in the second resource pool is selected based on the selected first resource and the one-to-one correspondence relationship.

8. The method of claim 5, further comprising:

receiving, from the second device, the first control information, based on a first resource in the first resource poo; and receiving the first reference signal, based on a second resource in the second resource pool, wherein the first resource and the second resource are selected in the resource selection procedure.

9. The method of claim 8, further comprising:
selecting a third resource in the first resource pool and a fourth resource in the second resource pool;
transmitting, to the second device, second control information related to a transmission of a second reference signal, based on the third resource; and
transmitting, to the second device, the second reference signal, based on the fourth resource,
wherein a positioning for the second device is performed based on based on the first reference signal and the second reference signal.

10. The method of claim 1, wherein a transmission of a reference signal and a transmission of control information related to a transmission of a reference signal are enabled in the first resource pool.

11. The method of claim 1, wherein only a transmission of a reference signal is enabled in the second resource pool.

12. The method of claim 1, wherein the inter UE coordination message includes information for a preferred resource set.

13. The method of claim 1, wherein the first reference signal is a reference signal for a positioning.

14. A first device for performing wireless communication, the first device comprising:
at least one transceiver;
at least one processor; and
at least one memory operably connectable to the at least one processor and storing instructions that, based on being executed by the at least one processor, cause the first device to perform operations,
wherein the operations comprise:
obtaining information related to a first resource pool for receiving first control information related to a reception of a first reference signal and information related to a second resource pool for receiving the first reference signal,
wherein the first resource pool and the second resource pool have a one-to-one correspondence relationship;
including at least one second resource in the second resource pool, corresponding to at least one first resource in which a conflict in the first resource pool is expected, into a first non-preferred resource set for the first reference signal;
including at least one fourth resource in the first resource pool, corresponding to at least one third resource in which a conflict in the second resource pool is expected, into a second non-preferred resource set for the first control information; and
transmitting on the first resource pool, to a second device, an inter user equipment (UE) coordination message, including information for the first non-preferred resource set and information for the second non-preferred resource set.

15. A device adapted to control a first user equipment (UE), the device comprising:
at least one processor; and
at least one memory operably connectable to the at least one processor and storing instructions that, based on being executed by the at least one processor, cause the first UE to perform operations,
wherein the operations comprise:
obtaining information related to a first resource pool for receiving first control information related to a reception of a first reference signal and information related to a second resource pool for receiving the first reference signal,
wherein the first resource pool and the second resource pool have a one-to-one correspondence relationship;
including at least one second resource in the second resource pool, corresponding to at least one first resource in which a conflict in the first resource pool is expected, into a first non-preferred resource set for the first reference signal;
including at least one fourth resource in the first resource pool, corresponding to at least one third resource in which a conflict in the second resource pool is expected, into a second non-preferred resource set for the first control information; and
transmitting on the first resource pool, to a second UE, an inter UE coordination message, including information for the first non-preferred resource set and information for the second non-preferred resource set.

* * * * *